United States Patent [19]
Soya et al.

[11] 3,918,910
[45] Nov. 11, 1975

[54] SYSTEM FOR DETECTING THE PARTICULAR CHEMICAL CONSTITUENT OF A FLUID

[75] Inventors: Isao Soya; Katsuhiko Kimura; Tooru Nobuto; Yawara Nagai, all of Hachioji, Japan

[73] Assignee: Olympus Optical Co., Ltd., Tokyo, Japan

[22] Filed: July 24, 1974

[21] Appl. No.: 491,521

[30] Foreign Application Priority Data
July 31, 1973  Japan................................ 48-85395
July 31, 1973  Japan......................... 48-89928[U]
July 31, 1973  Japan......................... 48-88929[U]
July 31, 1973  Japan......................... 48-88930[U]

[52] U.S. Cl........ 23/253 R; 23/253 TP; 235/151.35
[51] Int. Cl.².................. G01N 33/16; G01N 21/30
[58] Field of Search........... 23/253 TP, 253 R, 259, 23/230 R; 235/151.35

[56] References Cited
UNITED STATES PATENTS
| | | | |
|---|---|---|---|
| 3,368,872 | 2/1968 | Natelson | 23/253 R |
| 3,497,320 | 2/1970 | Blackburn et al. | 23/253 X |
| 3,554,700 | 1/1971 | Maxon | 23/253 X |
| 3,607,090 | 9/1971 | Maxon | 23/253 TP |
| 3,620,678 | 11/1971 | Guigan et al. | 23/253 R |

*Primary Examiner*—R. E. Serwin
*Attorney, Agent, or Firm*—Flynn & Frishauf

[57] ABSTRACT

A system for detecting the particular constituent of a fluid which comprises a cassette for holding a plurality of chemical reaction-testing strips each provided with a plurality of carriers containing reagents; means for drawing out said chemical reaction-testing strips one after another from the cassette and bringing a test fluid filled in a container into contact with the respective reagent carriers of the strip; means for producing an electric signal corresponding to the degree of a chemical reaction between the test fluid and any of said reagent carriers; and means for printing out data denoting the degree of said chemical reaction.

4 Claims, 37 Drawing Figures

F I G. 13
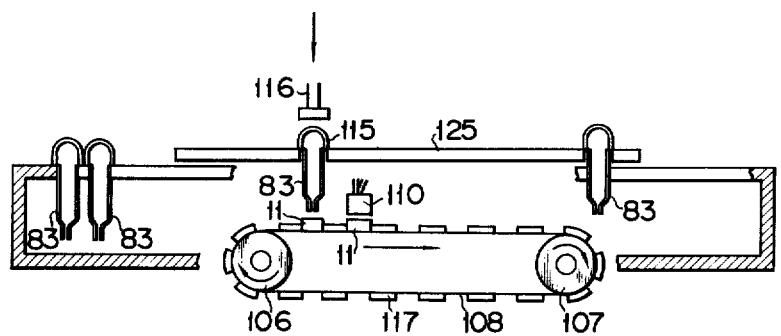
F I G. 14
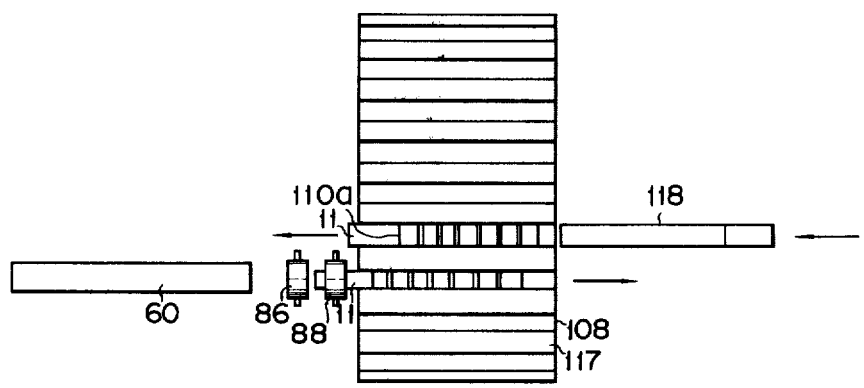
F I G. 15
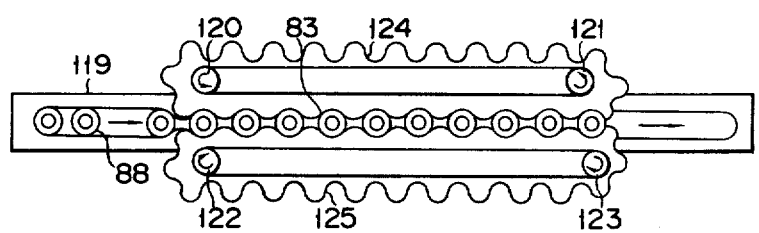

FIG. 20
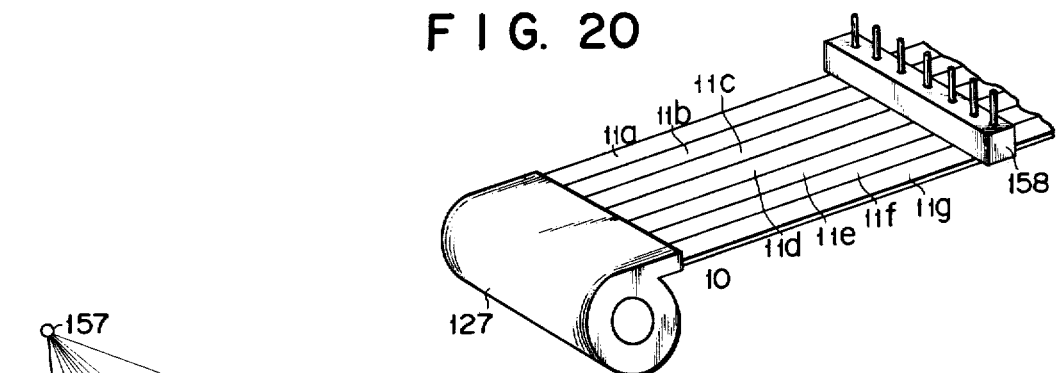
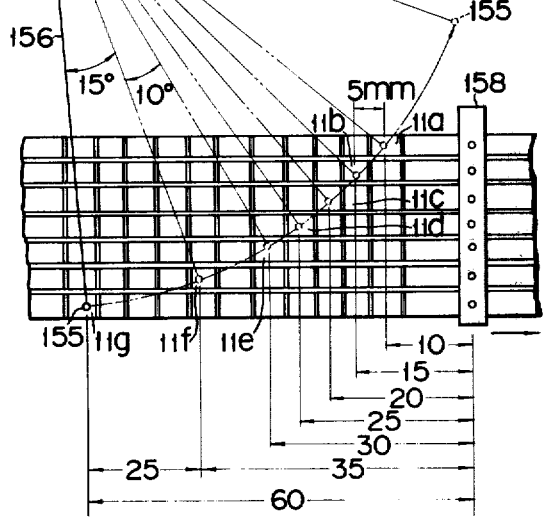
FIG. 21
FIG. 22
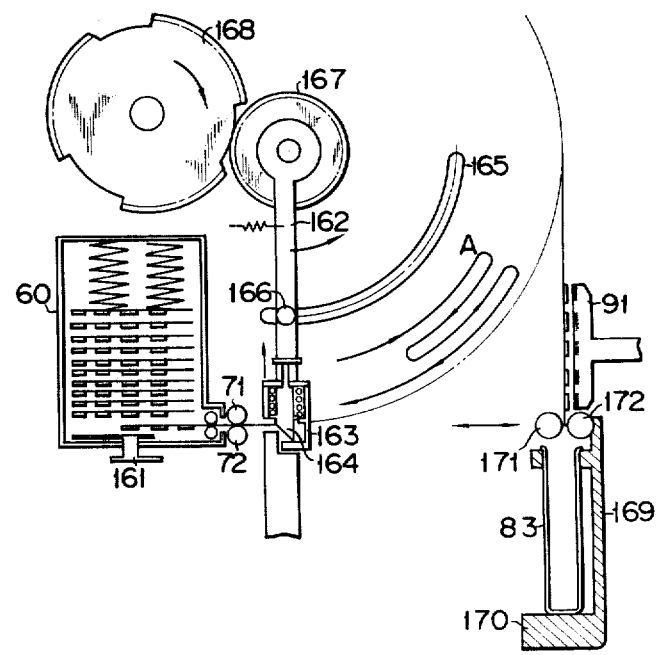

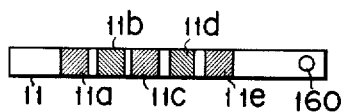
FIG. 23
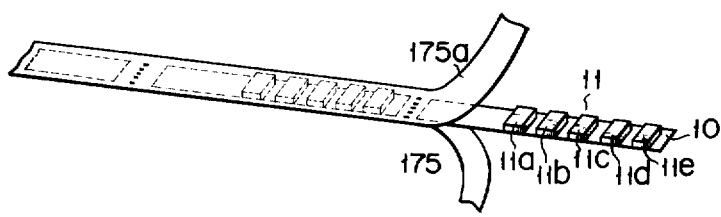
FIG. 24
FIG. 25
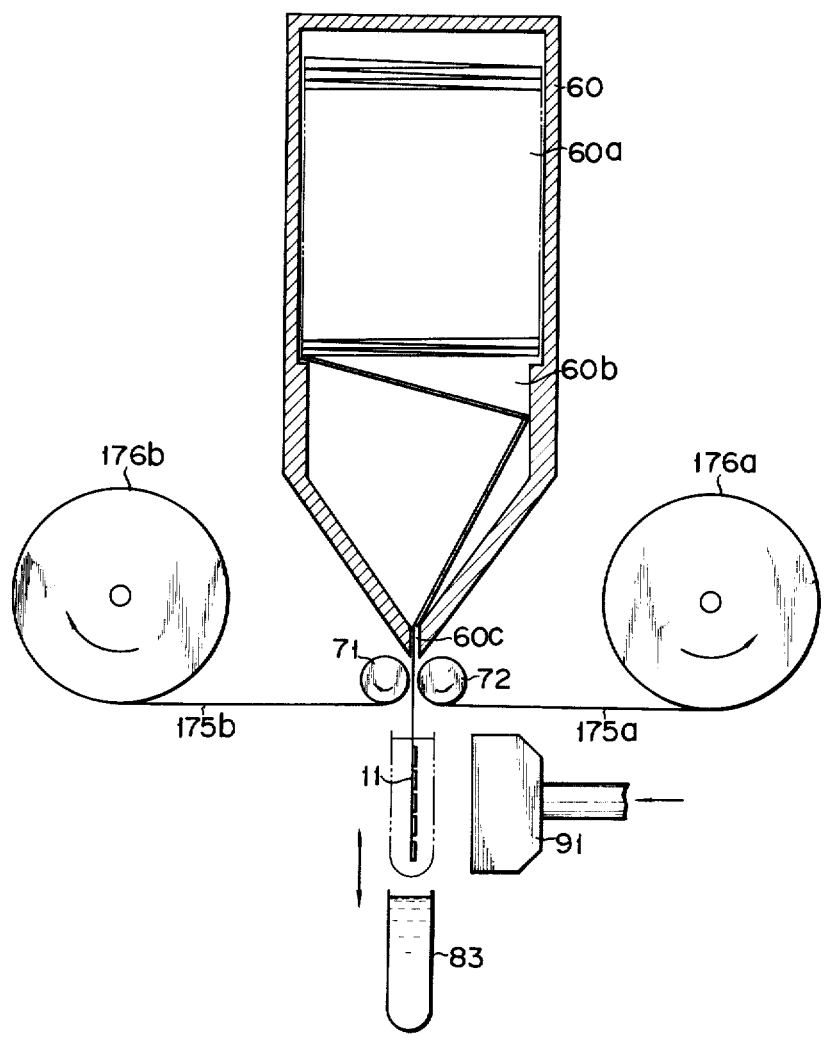

SYSTEM FOR DETECTING THE PARTICULAR CHEMICAL CONSTITUENT OF A FLUID

BACKGROUND OF THE INVENTION

This invention relates to a system for detecting the particular chemical constituent of a fluid which is designed to bring a test fluid into contact with a reagent, determine the degree of the chemical reaction of the reagent represented by its changed color, and automatically print out the results of said determination.

The prior art process of clinically examining, for example, urine consists in immersing a testing strip soaked with a reagent in the urine, determining that degree of a chemical reaction between the urine and reagent which is represented by the changed color of said reagent, comparing by naked eye said changed color with those set forth in a colorimetric chart, thereby defining the pH of the urine and the concentrations of, for example, protein and glucose contained in the urine.

However, such naked eye determination presents not only difficulties in accurately distinguishing the changed color of a reagent but also is too inefficient to be applied to a large number of examinations.

SUMMARY OF THE INVENTION

It is accordingly the object of this invention to provide a system for detecting the particular chemical constituent of a fluid automatically and quickly with high precision. This object is attained, according to this invention, by providing a system for detecting the particular chemical constituent of a fluid which comprises means for bringing a test fluid into contact with the respective reagent-containing carriers mounted on a testing strip; means for photoelectrically detecting the changed colors of said reagents corresponding to the degrees of chemical reactions between said reagents and the test fluid and generating electric signals representing said changed colors; and means for printing out data on the particular chemical constituent of the test fluid according to said chemical reactions.

BRIEF DESCRIPTION OF THE DRAWINGS

FIG. 13 is a sectional view on line XIII—XIII of FIG. 11;

FIG. 14 is a plan view of FIG. 11;

FIG. 15 is a plan view of a test fluid tube feeder;

FIG. 20 is an oblique view of a device for dripping a test fluid on the reagent carriers;

FIG. 21 is a plan view of FIG. 20;

FIG. 22 gives the arrangement of an automatic detection system according to a fifth embodiment of the invention;

FIG. 23 is a plan view of another example of a testing strip used with the detecting device of FIG. 22;

FIG. 24 is an oblique view of another example of a testing strip;

FIG. 25 sets forth the arrangement of an automatic detection system according to a sixth embodiment of the invention;

DETAILED DESCRIPTION OF THE INVENTION

Figure 1:
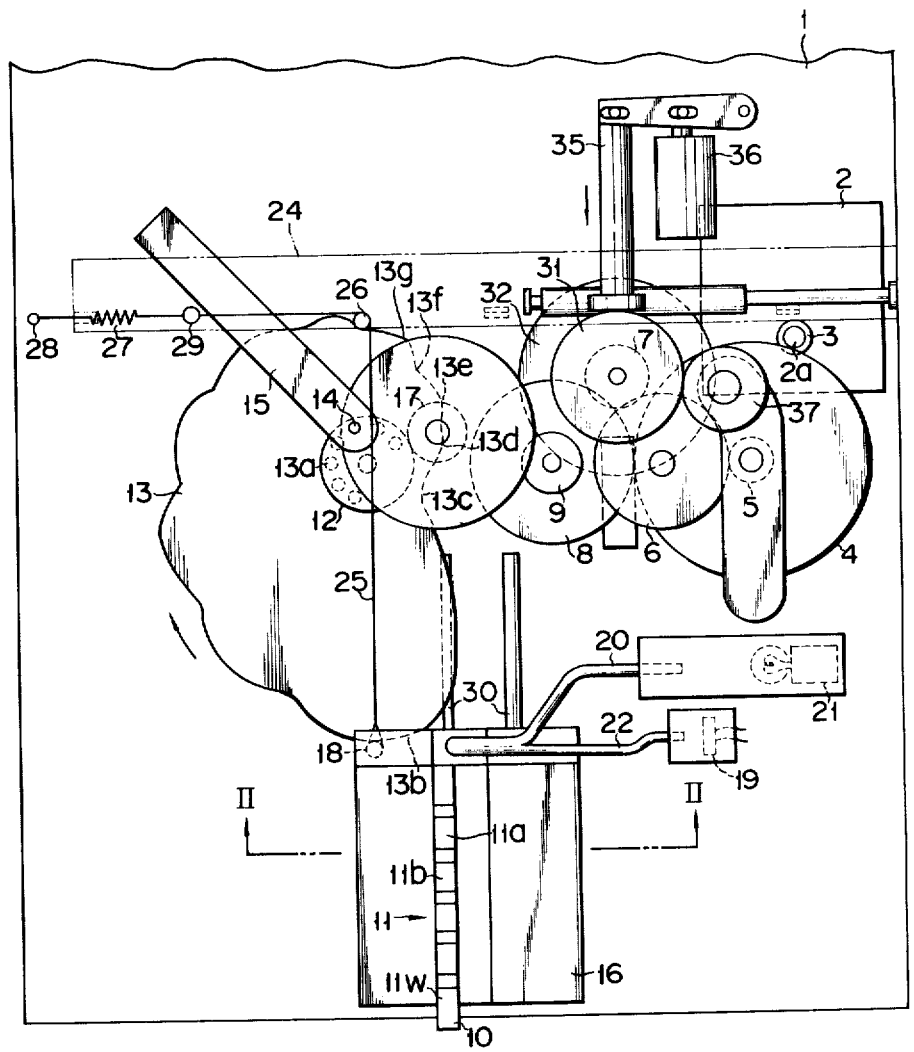
FIG. 1 is a plan view of an automatic clinic detection system according to an embodiment of this invention.
Figure 2:
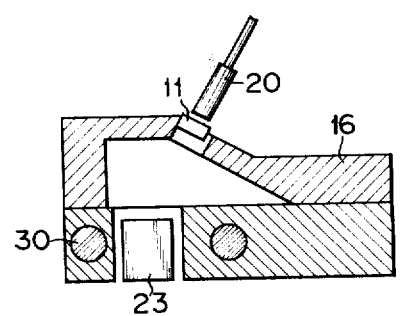
FIG. 2 is a sectional view on line II—II of FIG. 1 as viewed in the direction of the indicated arrows.
Figure 3:
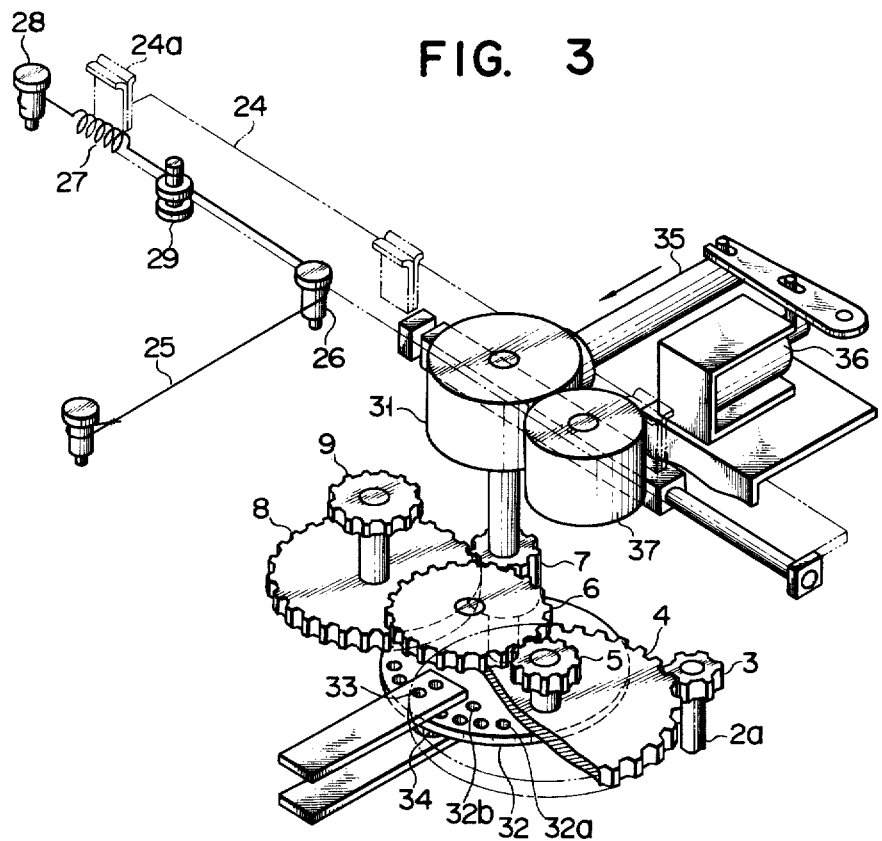
FIG. 3 presents the oblique views of the recording sheet feeder and the dismembered parts of the printing mechanism included in the automatic detection system of FIG. 1.

There will now be described the concrete particulars of an automatic detection system according to this invention by reference to the appended drawings. Referring to FIG. 1, referential numeral 1 denotes an apparatus support, and numeral 2 is a drive motor, whose shaft 2a is fitted with a gearwheel 3 engaging a gearwheel 4. A gearwheel 5 is concentrically coupled with said gearwheel 4. There are provided other gearwheels 6, 7, 8, 9, 12, 17. All the above-mentioned gearwheels constitute a transmission mechanism. Mounted on the shaft of the gearwheel 12 is a cam plate 13 bored with signal holes 13a. Referential numeral 14 shows a source of light such as a light-emitting diode attached to the end of an arm 15 fixed to the appratus support 1. Provided on the opposite side of the cam plate 13 to the arm 15 is a light-receiving element (not shown) positioned on the locus of the signal holes 13a which are moved in a circumferential direction when the cam plate 13 rotates. When the light source 14 and any of the signal holes 13a are aligned, the light-receiving element is supplied with a light from said source 14 passing through said signal hole 13a to give forth a signal B. Referential numeral 16 shows a sample rest on which there is placed a test sheet 11 consisting of a plurality of reagent-containing carriers 11a spatially pasted on a narrow transparent plastic plate 10. Referential number 18 is a roller fixed to the underside of the sample rest 16 so as to face the operating surface of the cam plate 13. Referential numeral 21 is a source of light for determination, 20 is a light guide of optical fiber for transmitting a light from the source 21 and focusing said light on one point on the sample rest 16, and 19 is a light-receiving element for measurement which is supplied through another light guide 22 with a light reflected from the surfaces of the respective reagent carriers 11a mounted on the test sheet 11. Another light-receiving element 23 is disposed, as shown in FIG. 2, below the sample rest 16 so as to be supplied with a light from the source 19 passing through those exposed transparent portions 11b of the test sheet 11 on which no reagent carrier 11a is mounted, and give forth the later described signal A. Referential numeral 24 is a feeder provided with holder plates 24a (FIG. 3) for holding a recording sheet on which printing is made. Referential numeral 25 (FIG. 3) denotes a wire fixed at one end to one side of the sample rest 16, and at the other end to the test sheet feeder 24 and has its intermediate part thrown about a roller 26. Referential numeral 27 (FIG. 3) is a spring stretched across a pin 28 fixed to the apparatus suppot 1, and another pin 29 provided on the underside of the test sheet feeder 24. The spring normally pulls the test sheet feeder 24 to the left side of FIG. 1. The wire 25 pulls the sample rest 16 to the upper part of FIG. 1. Accordingly, the roller 18 fitted to the sample rest 16 normally abuts against the cam plate 13. Referential numeral 30 is a shaft fixed on the apparatus support 1 to act as a guide for the sample rest 16 when it moves. Referential numeral 31 is a printing drum fixed, as clearly shown in FIG. 3, to a shaft fitted with a gearwheel 7. Referential numeral 32 is a disc penetrated by said shaft at the center. Said disc 32 is bored with numerous signal holes 32a and a single reset hole 32b. Disposed on both sides of the bored portion of the disc 32 are a source of light such as a light-emitting diode 33 and a light-receiving element 34 as illustrated in FIG. 3. Referential numeral 35 is a printing hammer urged in the direction of the indicated arrow by a solenoid 36. Referential numeral 37 is a printing ink roller.

Figure 4:
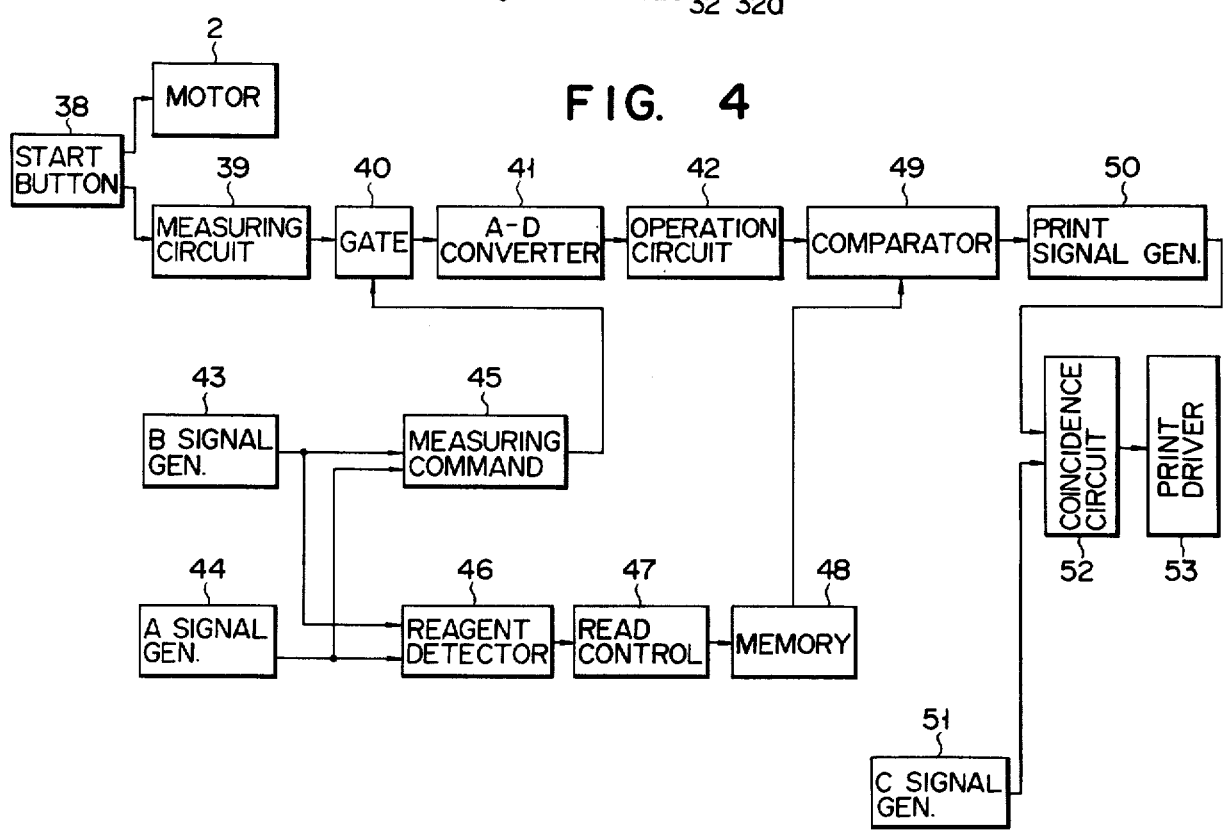
FIG. 4 is a block circuit diagram of the automatic detection system of FIG. 1.

FIG. 4 is a block circuit diagram showing a measuring circuit, etc. Referential numeral 38 is a start button, 39 a measuring circuit, 40 a gate circuit, 41 an analog-digital converter, 42 an arithmetic operation circuit, 43 a signal B, 44 a signal A, 45 a measurement instructing circuit, 46 a reagent distinguishing circuit, 47 a readout control circuit, 48 a memory, 49 a comparator, 50 a printing instructing circuit, 51 a signal C, 52 a coincidence circuit and 53 a printing driver.

There will now be described the operation of a detection system according to this invention. Before the start, the operating surface 13b of the cam plate 13 is pressed against the roller 18 fixed to the sample rest 16, which is therefore kept in the lowest position in FIG. 1. After the test sheet 11 is placed at a prescribed point on the sample rest 16 under the above-mentioned condition, the start button 38 is depressed to drive the motor 2 whose rotation is transmitted by the aforesaid assembly of gearwheels. As the result, the printing drum 31 fitted to the shaft of the gearwheel 7 rotates, causing the cam plate 13 to swing in the direction of the indicated arrow. The swing of the cam plate 13 leads to the shifting of the operating surface thereof contacted by the roller 18 from the original operating surface 13b to 13c. Since the latter operating surface 13c is located nearest to the center of the cam plate 13 as apparent from FIG. 1, the roller 18 designed always to contact the operating surface of the cam plate 13 is shifted to the upper part of FIG. 1. Upon the further swing of the cam plate 13, its surface contacted by the roller 18 is changed from 13c to 13d. Since this operating surface 13d keeps a fixed distance from the center of the cam plate 13, the roller 18, namely, the sample rest 16 maintains an unchanged position, even while the cam plate 13 continues to swing. When the roller 18 contacts the operating surface 13d, the test sheet 11 placed on the sample rest 16 allows its calibration sheet 11w to be brought to a point of measurement. Accordingly, a light from the source for measurement is obstructed by the calibration sheet 11w, failing to reach the light-receiving element 23 disposed below the sample rest 16. When the light-receiving element 23 is prevented by the calibration sheet 11w from being supplied with any light, then the signal A is continuously generated for a prescribed length of time. Since the signal holes 13a of the cam plate 13 face the corresponding operating surfaces thereof, a light from the source 14 passes through any of the signal holes 13a to be detected by a detection element, which in turn produces a signal B. Now, reference is made to FIG. 4. First, a calibration sheet 11w alone is placed on the sample rest 16 and supplied with a light from the source 14 to determine the light reflectivity of said calibration sheet 11w as a referential value. When the signals A, B are generated at the same time, the measurement-instructing circuit 45 gives forth said instruction to open the gate circuit 40 for commencement of measurement. The reagent-distinguishing circuit 46 distinguishes between the reagents. As the result, the readout control circuit 47 controls the readout of stored values. The measured degrees of chemical reactions between a test fluid and the respective reagents are defined and stored in the memory 48.

Reverting to FIG. 1, where the cam plate 13 further swings, the roller 18 is brought to the stepped surface 13e of the cam plate 13, then said roller 18 is removed from the center of the cam plate 13 by a difference h between the larger distance of said cam surface 13e from said center and the smaller distance of the preceding cam surface 13d from said center, resulting in the rapid movement of the sample rest 16. If the respective reagent carriers 11a are arranged on the test sheet 17 at an interval equal to the above-mentioned difference h of the distances, or the height of the stepped cam surface of 13e, then the reagent carriers 11a will be brought one after another exactly to the point of measurement by the movement of the sample rest 16. Where the reagent carrier 11a obstructs the passage of a light from the source 14, then the corresponding photoelectric element gives forth a signal A denoting said obstruction. Immediately after, the roller 18 contacts the succeeding cam surface 13f, causing the following one of the signal holes 13a of the cam plate 13 to be brought to a position facing the light source 14. As the result, a signal B is generated to open the gate 40 (FIG. 4) for resumption of measurement. The reagent whose color has already changed according to the degree of a chemical reaction between said reagent and a test fluid is brought to the point of measurement and a reflection corresponding to said changed color is transmitted from the surface of the carrier through the light guide 22 to the light-receiving element 21. An output signal from said light-receiving element 21 passes through the A-D converter 41, and arithmetic operation circuit 42 to be compared by the comparator 49 with a referential value previously stored in a separate circuit. The printing instructing circuit 50 gives forth a printing command signal D according to the result of said comparison. As shown in FIG. 3, signals C corresponding to the types provided on the printing drum 31 are continuously issued by means of the signal holes 32a of the disc 32 concentrically fitted to the lower part of the printing drum 31 and the light source 33 and light-receiving element 34 disposed on the opposite sides of said disc 32. When coincidence takes place between the aforesaid printing command signal D and any of the latter signals C representing the types of the printing drum 31 as the result of their comparison in the coincidence circuit 52, then a printing signal H is produced to operate the solenoid 36, causing the required value and rotation to be printed by the printing hammer 35. In this case, it is advised that the cam surface 13f be made to have a length (or more correctly a swing angle) corresponding to a time required for measurement and printing to be completed after generation of the signals A, B. When the roller 18 is brought to the succeeding stepped cam surface 13g after passing over the preceding cam surface 13f, then the test sheet 11 is rapidly forwarded for a prescribed interval as previously described. Where the roller 18 again contacts the starting cam surface 13b after repetition of the above-mentioned operation, an entire cycle of measurement and printing is brought to an end. It will be noted that the cam plate 13 is previously provided with a sufficient number of cam surfaces to match the number of reagent carriers 11a mounted on the test sheet 11. The detection system is all stopped by proper means for automatically shutting off a power supply upon termination of said cycle. A measured test sheet 11 and a printed recording sheet are removed, and a fresh test sheet 11 and a fresh recording sheet are placed in the detection system ready for the succeeding cycle of measurement and printing.

The foregoing description refers to the case where the calibration sheet 11w was first attached to the lowest part of the test sheet 11 (FIG. 1) and then a plurality of reagent carriers 11a were mounted on the remaining portion of the test sheet 11. However, the calibration sheet 11w may be disposed anywhere on the test sheet 11 with the operating surface of the cam plate 13 properly modified. No signal A and consequently no measurement take place with respect to the exposed transparent portions of the test sheet 11 which are free from the calibration sheet 11w and the reagent carrier 11a. Therefore, the points on the test sheet 11 at which the signal A is given forth can determine the kinds and sequential positions of the reagents used.

Though the foregoing embodiment was provided with a cam plate having stepped surfaces spatially provided, yet a step-free cam plate may be used. However, the stepped cam plate is more preferred, because high precision measurement can be made of a reagent carrier by stopping it at a prescribed point of measurement, and printing can be made exactly on the prescribed part of a recording sheet standing at a rest. Holes 13a as means for generating a signal B need not be bored exclusively in the cam plate 13, but may be provided in the sample rest 16 or test sheet feeder 24. Further, the sample rest 16 and test sheet feeder 26 may be connected by any other means than the wire 25. Said sample rest 16 and test sheet feeder 26 may also be placed on the same plate to be coupled together by movement, depending on the arrangement of the detection system.

As mentioned above, the detection system of this invention, when supplied with power, can automatically measure the degree of chemical reactions between a test fluid soaked in the test sheet 11 placed on the sample rest 16 and various kinds of reagents contained in the carriers 11a mounted on said test sheet 11 and print out the results of measurement on a recording sheet.

Figure 5:
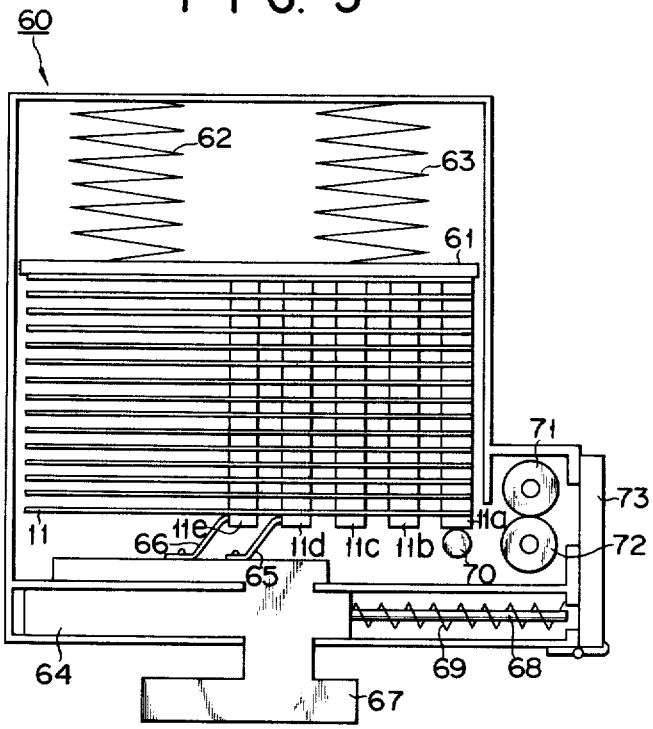
FIG. 5 illustrates the construction of a testing strip cassette included in the automatic detection system of the invention.
Figure 6:
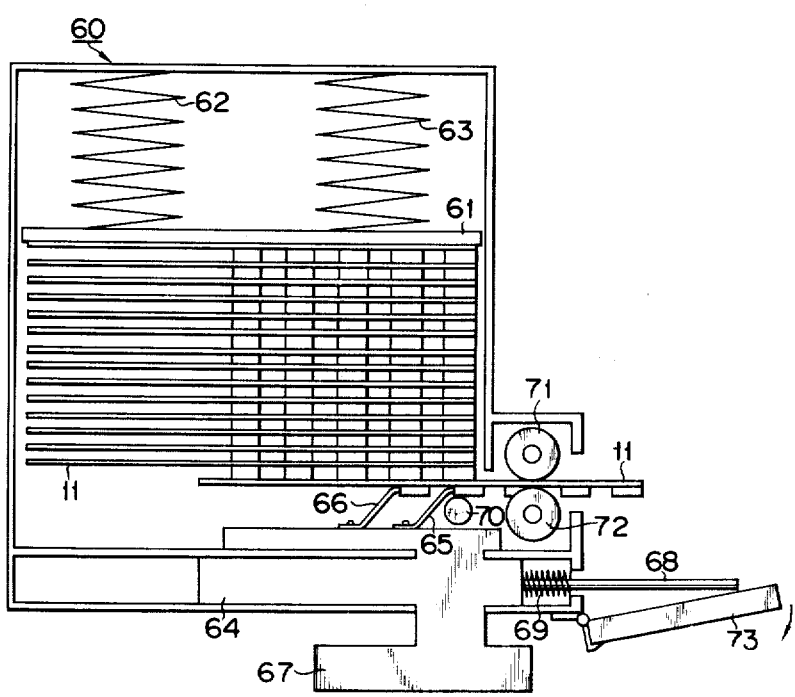
FIG. 6 shows one of the testing stripss while it is being drawn out of the cassette of FIG. 5.

FIG. 5 shows an example of a cassette 60 holding a large pile of test sheets or reagent strips 11 used with the detection system of this invention. The test sheets 11 which fail to display normal colors, when soaked with moisture should be effectively protected from external air, and also be easily drawn out one after another from the cassette 60. The case of the cassette 60 is formed of flat plates and numerous test sheets 11 are received therein in a state piled up in the same direction, while that side of each test sheet 11 which is provided with the reagent containers 11a to 11e is kept down. A pile of the test sheets 11 is placed on a rest plate 61. A pair of compression springs 62, 63 are stretched across the rest plate 61 and the underside of the upper wall of the cassette case, causing the test sheets 11 to be depressed downward by means of said rest plate 61. Disposed below the test sheet pile is a lever 64 which can slide lengthwise of the test sheets 11. The lever 64 has a pair of pawls 65, 66 and a downward extending projection 67 and is further fitted with a rod 68 wound with a compression coil spring 69 which urges the lever 64 to the left side of FIG. 5. A pair of rollers 71, 72 and a cap 73 are provided below one side wall of the cassette case. A coil spring is fitted to the cap 73 normally to close it.

Where the projection 67 of the lever 64 is urged rightward by a proper mechanism against the force of the spring 69, the pawls 65, 66 engage the reagent carriers 11d, 11e of the lowermost test sheet 11 to push it rightward. At this time, the rod 68 forces the cap 73 rightward, causing the cap 73 to swing clockwise also rightward, as shown in FIG. 6 for the removal of said lowermost test sheet 11 from the cassette 60. Since, in this case, said test sheet 11 is drawn out, as shown in FIG. 6, by being pinched between the paired rollers 71, 72, the interior of the cassette 60 is effectively shut off from external air even during said withdrawal. Further, the cap 73 which is normally closed substantially prevents atmospheric moisture from being carried into the cassette 60.

When the lowermost test sheet 11 leaves the cassette 60, the lever 64 is brought back to the left side by the action of the spring 69, ready to take out the succeeding test sheet 11.

Figure 7:
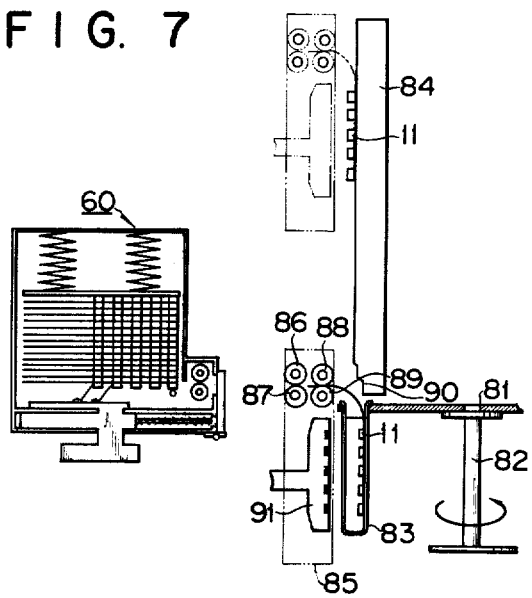
FIG. 7 sets forth the arrangement of the automatic detection system provided with the cassette of FIG. 5.

FIG. 7 shows the arrangement of an example of the automatic clinic detection system of this invention cooperating with the above-mentioned cassette 60. According to the embodiment of FIG. 7, a round table 81 is provided so as to be intermittently rotated about its shaft 82 by proper drive means. Bored in the peripheral portion of the table 81 are numerous (for example, fifty) test tube holes so as to hold test tubes filled with, for example, urine. For simplification of illustration, FIG. 7 indicates only one test tube 83 brought to a prescribed point of measurement for the urine contained therein.

An upright guide wall 84 is positioned above the table 81. A block 85 is also provided so as to move vertically parallel with said upright guide wall 84. This movable block 85 is fitted with two pairs of rollers 86-87, 88-89. The rollers 86-87 are drive rollers for further pulling out a test sheet 11 having the cassette 60 by pinching the forward end of said test sheet 11 between said rollers 86-87. The test sheet 11 is forwarded further rightward by the driven rollers 88-89. The bottom end portion of the guide wall 84 is provided with a curved guide plane 90. When, therefore, contacting said guide plane 90, the test sheet 11 is forcefully bent downward to be inserted into the test tube 83. The driven rollers 88-89 are further operated to bring down into the test tube to a prescribed depth, namely, until all the reagent carriers 11a to 11e are fully immersed in the urine filled in the test tube 83. At this time, the driven rollers 88-89 are stopped, causing the test sheet 11 to remain pinched therebetween. Thereafter, the movable block 85 is lifted, causing the test sheet 11 to be pulled out of the test tube 83 and slide upward along the guide wall 84 in a state still pinched between said driven rollers 88-89. A colorimetric head 91 fitted to the movable block 85 carries out the colorimetric determination of the respective reagents 11a to 11e at a prescribed time interval. According to the embodiment of FIG. 7, a large colorimetric head 91 is used for the colorimetric determination of all the reagent carriers 11a to 11e. The arrangement and operation of the colorimetric head 91 used in the embodiment of FIG. 7 will be later detailed. The movable block 85 is brought down after said colorimetric determination is completed, causing the measured test sheet 11 to be inserted again into the test tube 83 holding the urine, part of which has thus been measured. At this time, the driven rollers 88, 89 are again operated to disengage the test sheet 11, which is later wasted while left in the test tube 83. Thereafter, the table 81 is rotated one pitch in a prescribed direction to bring the succeeding tube to the point of measurement. Thus, measurement of one sample of urine is brought to an end. Thereafter, the same measurement operation is repeated with respect to all the remaining samples of urine.

Figure 8:
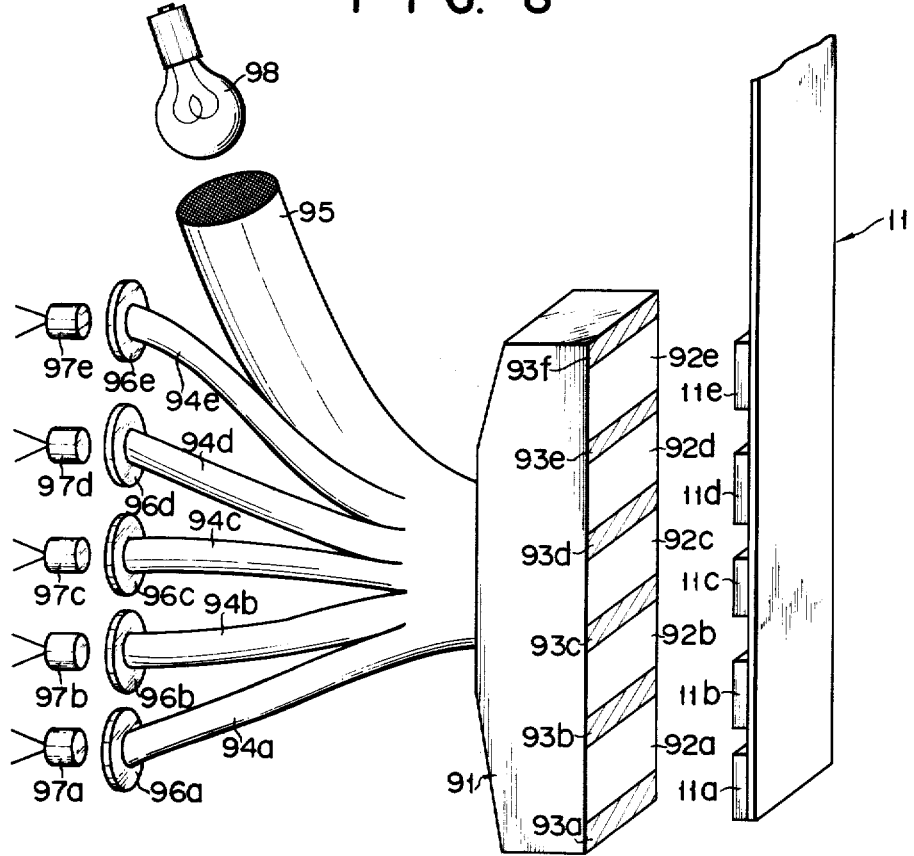
FIG. 8 is an oblique view of the colorimetric block of FIG. 7.

FIG. 8 is an oblique view of an example of the colorimetric head 91, showing the detailed arrangement. This colorimetric head 91 consists of an assembly of laminated fibers and is divided into light-receiving sections 92a to 92e corresponding to the reagent carriers 11a to 11e for colorimetric determination thereof and light-emitting sections 93a to 93f for illuminating said carriers 11a to 11e respectively, both groups of sections being alternately arranged such that the top and bottom portions of said head 91 are constituted by the light-emitting sections 93a, 93f. The light-receiving sections 92a to 92e are formed of fiber bundles 94a to 94e respectively, while the light-emitting secctions 93a to 93f are jointly formed of a single fiber bundle 95. The free ends of the fiber bundles 94a to 94e are made to face the photoelectric conversion elements 97a to 97e through the prescribed color filters 96a to 96e. The free end of the common fiber bundle 95 faces an illumination lamp 98. A light emitted from said lamp 98 passes through the fiber bundle 95 to be given forth from the light-emitting sections 93a to 93f. Beams of light reflected from the reagent carriers 11a to 11e are supplied to the light-receiving sections 92a to 92e, and thereafter delivered to the photoelectric conversion elements 97a to 97e through the fiber bundles 94a to 94e and color filters 96a to 96e. Output signals from said photoelectric conversion elements 97a to 97e represent the colorimetric values of the reagent carriers 11a to 11e.

The colorimetric head 91 arranged as described above suppresses irregular illumination due to the light-emitting sections 93a to 93f being alternately arranged with the light-receiving sections 92a to 92e in a sandwiched fashion, attaining accurate colorimetric determination. Therefore, the colorimetric head 91 of this invention eliminates the necessity of exchanging filters each time according to the kinds of reagents being measured, as is the case with a colorimetric head consisting of a single combination of a light-emitting section and a light-receiving section, or changing the position of the colorimetric head relative to the test sheet 11.

Figure 9:
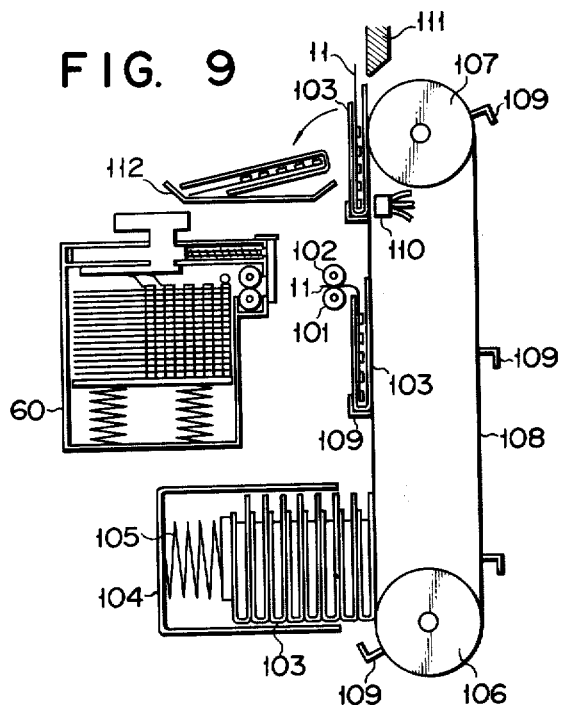
FIG. 9 indicates the arrangement of an automatic detection system according to a second embodiment of the invention.
Figure 10:
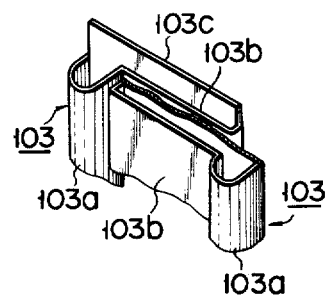
FIG. 10 is an oblique view of a test fluid container included in FIG. 9.

FIG. 9 sets forth a detection system according to another embodiment of this invention. In this embodiment, the position of the cassette 60 is vertically reversed from the embodiment of FIG. 7. A test sheet 11 delivered from the cassette 60 is forwarded by a pair of feed rollers 101, 102. In this embodiment, a test fluid, for example, urine is received in containers 103, each of which has such a special shape as shown in FIG. 10, instead of the test tubes used in the preceding embodiment. Each test fluid container 103 consists of a substantially semicylindrical portion 103a, a flat box-shaped portion 103b coupled therewith, and an extension 103c of a board constituting one side wall of said box-shaped portion 103b. Further, the containers 103 are juxtaposed, as shown in FIG. 9, such that the semicylindrical portions 103a of the adjacent containers 103 are disposed on the opposite sides.

All these test fluid containers 103 are received in a case 104. A compression spring 105 is stretched between the inner wall of the left side section (as indicated in FIG. 9) of the case 104 and the innermost container 103 so as to urge the assembly of said containers 103 rightward. There are further provided a pair of drive wheels 106, 107, across which an endless belt 108 is stretched. A plurality of L-shaped pawls 109 are equidistantly fited to the outer surface of said endless belt 108 so as to catch the containers 103 one after another for withdrawal from the case 104.

The drive wheels 106, 107 are intermittently operated and brought to rest at such a point as causes the test sheet 11 to fall into one of the containers 103 held by one of the pawls 109. At this time, the projection 67 of the lever 64 of the cassette 60 is moved rightward by a proper drive mechanism to pull out a test sheet 11 from the cassette 60. The test sheet 11 is further forwarded by being pinched between a pair of drive rollers 101, 102. When the forward end of the test sheet 11 touches the upper edge of the extension 103c of one side wall of the test fluid container 103, the end portion of the test sheet 11 is bent downward to be inserted into the flat box-shaped portion 103b of said container 103. Upon further operation of the drive rollers 101, 102, the test sheet 11 is fully brought into said box-shaped portion 103b. At this time the drive wheels 106, 107 are rotated in a prescribed direction, causing a test fluid container 103 holding test sheet 11 to pass by a colorimetric head 110 for successive colorimetric determination of the reagent carriers 11a to 11e in a prescribed short time. Since, in the embodiment of FIg. 9, colorimetric determination is made of the reagent carriers 11a to 11e of the test sheet 11 while it is still held in the test fluid container 103, at least the box-shaped portion 103b of said container 103 should be made of transparent material. Since, in the embodiment of FIG. 9, light is projected sidewise through the endless belt 108, it is obviously necessary to construct said belt 108 in a shape adapted for this purpose.

Upon completion of colorimetric determination, the drive wheels 106, 107 are again operated further to run the endless belt 108 until the board extension 103c of the test fluid container 103 contacts an arm 111. At this time, the container 103 is released from the corresponding pawl 109 to be dumped into a dish 112.

The embodiment of FIG. 9 effects the withdrawal of the test fluid container 103, the insertion of the test sheet 11 into said container 103, the colorimetric determination of the reagent carriers mounted on said test sheet 11 and the dumping of said sheet 11 upon completion of said determination substantially at the same time, thereby attaining the prominently high efficiency of the detection cycle.

In the embodiments of FIGS. 7 and 9, it is also possible to provide a fixed photoelectric conversion element, use a filter exchangeable each time according to the kind of a reagent carrier being measured, move the test sheet at a prescribed time interval and thereby carry out the successive colorimetric determination of the reagent carriers. In the embodiment of FIG. 9, a keep roller may be provided to hold each test fluid container 103 at the point at which the test sheet 11 is inserted thereinto. Further with respect to the colorimetric head 91, the light-receiving sections may be formed of four fiber bundles or a single fiber bundle. In the latter case, it is advised to use a filter exchangeable each time according to the kind of a reagent carrier being measured.

Figure 11:
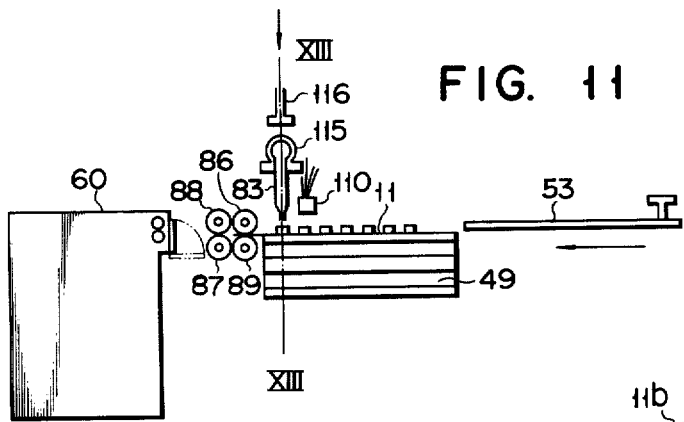
FIG. 11 shows the arrangement of an automatic detection system according to a third embodiment of the invention.
Figure 12:
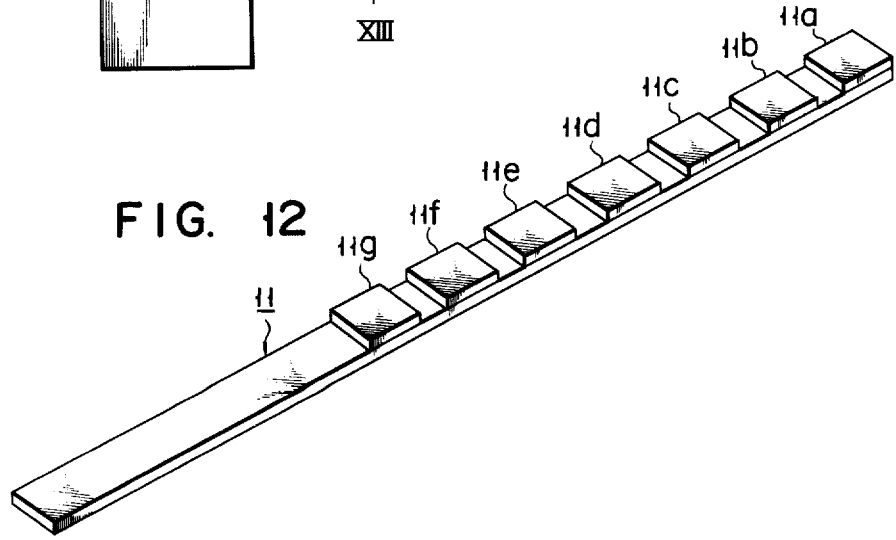
FIG. 12 is an oblique view of another example of a testing strip used in FIG. 11.

FIG. 11 shows an automatic clinic detection system according to still another embodiment of this invention which cooperates with the cassette 60. According to this embodiment, a test sheet 11 used is provided with seven reagent carriers 11a to 11g. A large number of such test sheets 11 are received in the cassette 60. The reagent carrier 11a is for measurement of the urobilinogen of urine, the reagent carrier 11b, for measurement of pH of the urine, the reagent carrier 11c for measurement of the protein thereof, the reagent carrier 11d for measurement of the occult blood thereof, the reagent carrier 11e for measurement of the bilirubin thereof, the reagent carrier 11f for measurement of the ketonic substances thereof and the reagent carrier 11g for measurement of the glucose thereof. Among the above-mentioned items of measurement, pH and protein can be measured any time after the test sheet 11 is immersed in and drawn out of the urine filled in the container. However, colorimetric determination should be made about 60 seconds after said withdrawal for the urobilinogen, about 30 seconds after said withdrawal for the occult blood, about 20 seconds after said withdrawal for the bilirubin, about 15 seconds after said withdrawal for the ketonic substances and about 10 seconds after said withdrawal for the glucose. According to the embodiment of FIG. 11, a test fluid is dripped, as later described, on the respective reagent carriers, enabling many measurements to be effected at prescribed points of time using a relatively simple test sheet-feeding mechanism.

There will now be described the arrangement and operation of the embodiment of FIG. 11. Two pairs of rollers 86–87, 88–89 are provided near the exit of the cassette 60. A test sheet 11 pulled out of the cassette 60 is forwarded by being pinched between said rollers. Positioned above the passageway of the test sheet 11 are a plurality of test fluid containers 83, each of which is shaped like a syringe and provided with a rubber cap 115 at the top. When the cap 115 is depressed by a push pin 116, the urine in the container 83 is dripped on the reagent carriers 11a to 11g in succession. This dripping is effected by interlocking the push pin 116 with the drive rollers 86 to 89 for conducting the test sheet 11 to the point of dripping a test fluid, and descending the push pin 116 when the bottom end of the syringe-shaped container 83 is brought right above any of the reagent carriers 11a to 11g. According to the embodiment of FIG. 11, one pitch between the respective reagent carriers 11a to 11g is advanced in 3.5 seconds. A test fluid is dripped first on the reagent carrier 11a, 3.5 seconds later on the reagent carrier 11b and thereafter in the same way until the last reagent carrier 11g is supplied with the test fluid. Though the test sheet 11 was made to pass intermittently below the test fluid container 83 as described above, yet said test sheet 11 may be continuously forwarded.

FIG. 13 is a sectional view on line XIII—XIII of FIg. 11. FIG. 14 is a plan view of a detection system of FIG. 11, though the test fluid containers, holding mechanisms thereof and test sheet feeder are omitted. The test sheets 11 takes out of the cassette 60 are inserted, as shown in FIG. 14, by the rollers 86 to 89 into the areas defined between the spacers 117 mounted at a prescribed interval on the endless belt 108 stretched over a pair of drive wheels 106, 107. During the insertion of the test sheets 11 into the above-mentioned intervening areas, the reagent carriers 11a to 11g of each test sheet 11 are successively supplied with a test fluid. When the drive wheels 106, 107 are intermittently rotated clockwise as shown in FIG. 13, the belt 108 is intermittently run at right angles to the direction in which each test sheet 11 travels. The run of the belt 108 is carried out after each test sheet 11 has all its reagent carriers supplied with a test fluid and leaves the rollers 88, 89. Since, according to the embodiment of FIG. 11, a test fluid is successively dripped on the reagent carriers 11a to 11g at an interval of 3.5, it will take 3.5 sec. × 6 = 21.0 sec. for a single test sheet 11 to have all its reagent carriers supplied with a test fluid. During a period of 9 seconds after the dripping of the test fluid on the last reagent carrier 11g, the test sheet 11 is released from the rollers 88, 89 and fully placed on the belt 108. At this time, the drive wheels 106, 107 are operated to advance the belt 108 by one pitch so as to cause the reagent carrier 11g of the test sheet 11 supplied with a test fluid for the last time to be positioned right below the colorimetric head 110. Though the colorimetric head 110 itself is not indicated in FIG. 14, a dotted circle 110a denotes the point at which colorimetric determination is effected. The colorimetric head 110 measures the last reagent carrier 11g nine seconds after said carrier 11g is supplied with a test fluid.

As previously mentioned, this last reagent carrier 11g is intended for measurement of the glucose of urine. Accordingly, said measurement should be carried out about 10 seconds after urine is dripped on said carrier 11g. Thereafter the test sheet 11 advanced by one pitch using the push rod 118 so as to bring the succeeding reagent carrier 11f right below the colorimetric head 110. This one pitch movement is effected at an interval of 3.5 seconds from the preceding colorimetric determination. Accordingly, the reagent carrier 11f is subjected to colorimetric determination 16 seconds after urine is dripped thereon. Said reagent carrier 11f is intended for measurement of the ketonic substances of urine and should be measured about 15 seconds after said dripping. Therefore, the actual starting point of time of measurement only slightly differs from the prescribed one. 3.5 seconds later, the push rod 118 is again operated to advance the test sheet 11 by one pitch, causing the reagent carrier 11e to be positioned right below the colorimetric head 110. This reagent carrier 11e undergoes colorimetric determination 23 seconds after it is supplied with urine. Since said reagent carrier 11e is intended for measurement of the bilirubin of urine and should be measured 20 seconds after the dripping of urine, a very small difference takes place between the actual and prescribed starting points of time of measurement. 3.5 seconds later, the push rod 118 is again operated to forward the test sheet 11 by one pitch, causing the reagent carrier 11d to be disposed right under the colorimetric head 110 and measured 30 seconds after the dripping of urine. This reagent carrier 11d is intended for measurement of the occult blood of urine and should be measured 30 seconds after said reagent carrier 11d is supplied with urine. In this case, therefore, no difference arises between the actual and prescribed starting points of time of measurement. Similarly 3.5 seconds later, the push rod 118 is operated to move the test sheet 11 by one pitch to measure the reagent carrier 11c 37 seconds after the dripping of urine. This carrier 11c is for measurement of the protein of urine and can sequently admit of measurement at any point of time after the dripping of urine. 3.5 seconds later, the push rod 118 is operated to forward the test sheet 11 by one pitch to measure the reagent carrier 11b 44 seconds after the dripping of urine. Since this reagent carrier 11b is for measurement of the pH of urine, the actual starting point of time of measurement doew not raise any problem. 3.5 does seconds later, the push rod 118 is finally operated to advance the test sheet 11 by one pitch to measure the reagent carrier 11a 51 seconds after the dripping of urine. This carrier 11a is intended for measurement of the urobilinogen of urine and should be measured about 60 seconds after the dripping of urine. Though a somewhat short time is allowed for chemical reaction between the urine and the reagent contained in said carrier 11a, no noticeable difference arises between the actual and prescribed starting points of time of measurement. After all the reagent carriers 11a to 11g have been measured, the push rod 118 is further driven to let fall the test sheet 11 from the endless belt 108. The released test sheet 11 may be dumped into a suitable waste receptacle.

According to the embodiment of FIG. 11, the test sheet 11 passes at a time interval of 3.5 seconds below the point at which a test fluid is dripped, simplifying the test sheet feeding mechanism and the mechanism for controlling said feeding. Further, the push pin 116 for effecting the dripping of a test fluid is driven at the same time interval of 3.5 seconds, simplifying its drive mechanism. The push rod 118 for advancing the test sheet 11 is also operated at a time interval of 3.5 seconds, admitting of its simple arrangement.

Moreover, the embodiment of FIG. 11 causes a test fluid to be dripped on the reagent carriers one after another, preventing a reagent soaked in a carrier from leaking out and adversely affecting measurement as is often observed when all the reagent carriers of a test sheet 11 are immersed in a test fluid at once.

There will now be described mainly with reference to FIG. 13 and 15 the means for transporting the test fluid containers 83 successively to the point at which the test fluid is dripped. Said test fluid containers 83 are intermittently transported in the same direction as that in which the main drive endless belt 108 is run. Numerous test fluid containers 83 held by a support frame 119 are intermittently transported one after another through the test fluid dripping point by being pinched between the facing depressions of a pair of corrugated endless belts 124, 125 respectively stretched across two groups of drive wheels 120–121, 122–123.

Figure 16:
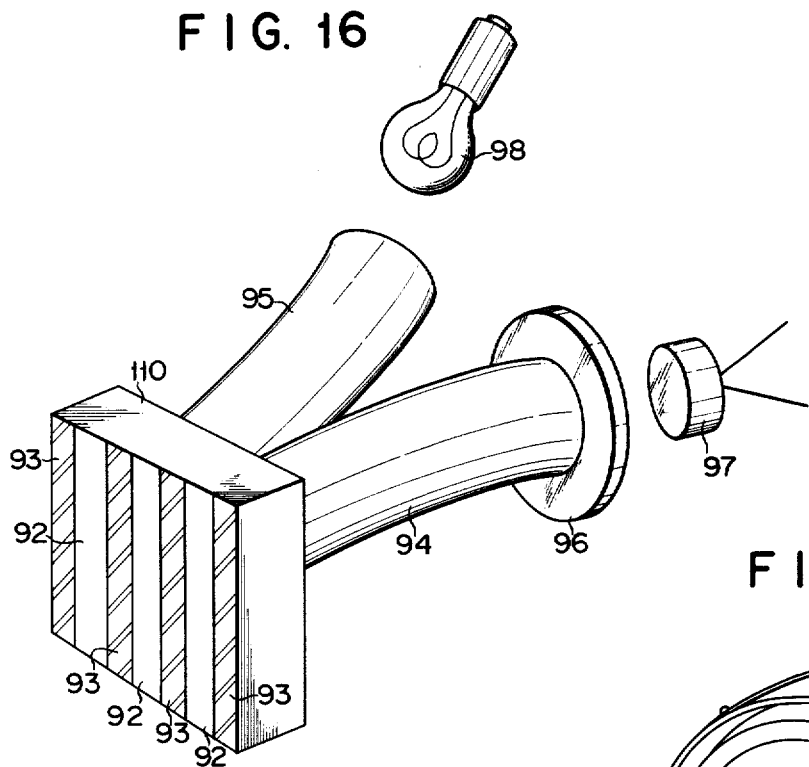
FIG. 16 is an oblique view of a colorimetric head.

FIg. 16 illustrates a colorimetric head 110 according to another embodiment of this invention. This colorimetric head 110 as a whole comprises numerous optical fibers, and is divided into a pluurality of light-emitting sections 93 and light-receiving sections 92. Both groups of sections are arranged alternately, such that both end portions of the colorimetric head 110 are constituted by the light-emitting sections 93. The light-emitting sections 93 are converged into a single common bundle 95 of fibers facing an illuminating lamp 98. The light-receiving sections 92 are similarly converged into a single common bundle 94 of fibers facing a photoelectric conversion element 97 through a color filter 96, which is made exchangeable for another according to the item of measurement or the kind of a reagent being measured.

The colorimetric head 110 of FIG. 16 has the light-emitting sections 93 and light-receiving sections 92 arranged alternately with each other, suppressing irregular illumination and attaining more accurate measurement. According to the embodiment of FIG. 16, the light-receiving sections 92 are converged into a single common bundle 94 of fibers. However, it is possible to form the light-receiving sections 92 of a plurality of fiber bundles facing the corresponding photoelectric conversion elements through different color filters. This arrangement completely eliminates or simplifies the exchange of color filters.

This invention is not limited to the already-described embodiments, but may be applied with various modifications. The embodiment of FIGS. 11 to 15 has the test sheet 11 advanced through the points at which a test fluid is dripped on the reagent carriers mounted on said sheet 11 and colorimetric determination is made of the degrees of chemical reactions between the test fluid and the reagents contained in the carriers, thereby simplifying the drive mechanism. Obviously, such arrangement is not always required. Namely, the mechanisms for transporting the test sheet 11 and test fluid containers may respectively consist of the known types. Further, the test sheet cassette is not limited to the previously mentioned type, but may be constructed in many other forms.

Figure 17:
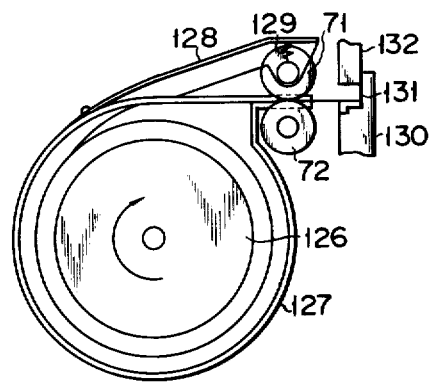
FIG. 17 is a side view of a testing strip cassette according to another embodiment of the invention.
Figure 18:
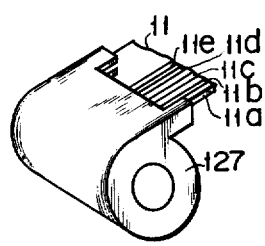
FIG. 18 is an oblique view of a roll film cassette.

There will now be described the embodiment of FIG. 17 to 19. A long rolled test sheet 11 is cut up into a plurality of strips at right angles to the length of said sheet 11. In this case, the rolled test sheet 11 is provided with reagent carriers 11a to 11e extending along the full length of said rolled sheet 11. As shown in FIG. 17, the roll of the test sheet 11 is mounted about a roll core 126 and received in a drum-shaped cassette 127. A pair of feed rollers 71, 72 are provided near the exit of the cassette 127 so as to successively draw out the rolled test sheet 11 by pinching it therebetween. The upper roller 71 is fitted to an arm 128 and pressed against the lower roller 72 by a spring 129 stretched between said arm 128 and upper roller 71. Since the rolled test sheet 11 is pulled out of the cassette 127 by being pinched between the paired feed rollers 71, 72, that portion of the rolled test sheet 11 which is received in the cassette 127 is effectively shut off from external air, preventing the reagent carriers 11a to 11e from being discolored or deteriorated.

The forward end of the rolled test sheet 11 successively pulled out of the cassette 127 strikes against the wall 131 of a cutter bed 130. At this time, a cutter blade 132 is brought down to cut the forward portion of the test sheet 11 at right angles to the length thereof.

Figure 19:
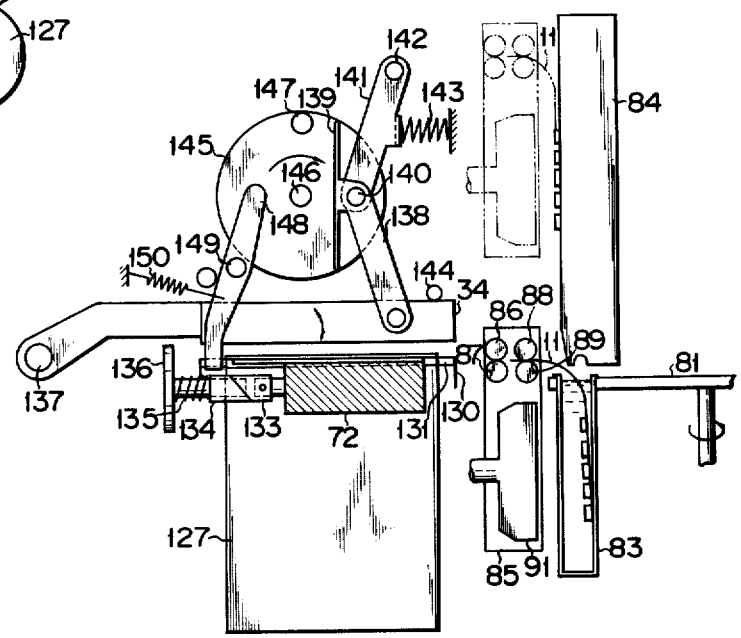
FIG. 19 is an oblique view of an automatic detection system according to a fourth embodiment of the invention.

As shown in FIG. 19, the lower feed roller 72 is rotated by a drive wheel 136 through inclined plane cam collars 133, 134 and spring 135. When the forward end of the rolled test sheet 11 successively drawn out of the cassette 127 touches the wall 131 of the cutter bed 130, the inclined plane cam collars 133, 134 are disengaged from each other against the urging force of the spring 135 to stop the lower roller 72, though the drive wheel 136 still continues rotation. A lever 138 is pivotally fitted at one end on the opposite side of the cutter blade 132 to the point at which it is pivotally disposed by means of a shaft 137. An actuating rod 139 is fixed to the opposite end of said lever 138. Another lever 141 is pivotally fitted at one end by means of a shaft 140, and at the other end by means of a shaft 142. A compression spring 143 is fitted to the intermediate part of the lever 141. The cutter blade 132 is urged counterclockwise about the shaft 137 by the spring 143 and levers 141, 138, but under control by a pin 144. A drive disc 145 is so provided as to rotate about a shaft 146 for cooperation with the actuating rod 139. An actuating pin 147 is fitted to the periphery of the drive disc 145. When the actuating disc 145 rotates clockwise, the actuating pin 147 engages the actuating rod 139, causing the lever 138 to swing clockwise against the force of the spring 143 and in consequence the cutter blade 132 to rotate clockwise about the shaft 137. As the result, the test sheet 11 pulled out of the cassette is cut into a test strip shown, for example, in FIG. 12, on which the prescribed reagent carriers are mounted.

Further, a lever 148 is provided to rotate about a shaft 149. When the actuating pin 147 abuts against one end of the lever 148 as the result of the clockwise rotation of the drive disc 145, the lever 148 swings counterclockwise against the force of a spring 150. The opposite end of the lever 148 touches the cut test sheet 11 to forward it in a direction perpendicular to the length. Thereafter, as in the embodiment of FIG. 7, the cut test sheet 11 delivered from the feeder is forwarded by being pinched between two pairs of feed rollers 86 to 89. The succeeding operation is carried out in the same way as in FIG. 7, description thereof being omitted.

There will now be described the operation of the test fluid dripping device of FIGS. 20 and 21. According to this device, a test fluid is dripped on a rolled test sheet at the same time interval as that at which chemical reactions take place between the test fluid and the adjacent reagent carriers representing different items of measurement, thereby enabling the colorimetric determinations of the degrees of chemical reactions appearing on the test sheet 11 to be effected at once.

The carriers 11a to 11g soaked with different reagents corresponding to the items of measurement such as the pH, protein and glucose of urine are arranged on a narrow base 10 in a sequential order specified for said reagents at a prescribed interval, such that if the narrow reagent carriers 11a to 11g are supposed to have a width of about 4 mm, a distance between the central lines of adjacent reagent carriers is chosen to be about 5 mm as shown in FIG. 21.

A long test sheet 11 provided with the reagent carriers 11a to 11g representing different items of measurement is rolled in a moisture proof cartridge 127 of the same construction as shown in FIG. 17 and automatically drawn out as required.

A device for dripping urine on the reagent carriers 11a to 11g comprises, as shown in FIG. 21, a pipette 155 fitted to the end of an arm 156 pivotally fitted to a shaft 157. The pipette 155 rotates counterclockwise along part of the locus of the end of the arm 156 when it swings, at the same speed as that at which the reagent carriers 11a to 11g are successively forwarded to the right.

A colorimetric head 158 consisting of seven measurement sections corresponding to seven items of measurement is located at such a point as is reached by the reagent carrier 11a presenting the quickest reaction when transported for about 10 seconds after it is supplied with urine from the pipette 155 for the last time. The pipette 155 fitted to the end of the arm 156 travels along part of the locus of the end of the arm 156 when it swings about the shaft 157 at a peripheral angle of 5°. After successively dripping urine on the reagent carriers 11a to 11g, the pipette 155 automatically discharges the remaining urine and, after washed, sucks up fresh urine ready for the succeeding rotation.

Where there are used reagent carriers 11a to 11g corresponding to different items whose colorimetric determinations are made, for example, in 60 seconds, 35 seconds . . . 10 seconds respectively after the dripping of urine, urine is first dripped on the reagent carrier 11g whose reaction takes 60 seconds. Thereafter when the arm 156 swings through a peripheral angle of 15°, namely, when the test sheel 11 is advanced for 25 seconds, the pipette 155 drips urine on the adjacent reagent carrier 11f. When the arm 156 further swings through a peripheral angle of 10°, the pipette 155 drips urine on the following reagent carrier 11e. When the arm 156 again swings through a peripheral angle of 5°, the pipette 155 drips urine on the reagent carrier 11d. Thereafter, each time the arm 156 swings through a peripheral angle of 5°, the pipette 155 drips urine on the reagent carriers 11c, 11b, 11a in succession. Since the series arranged reagent carriers 11a to 11g are supplied with urine, the colorimetric head 158 can distinguish the seven items of measurement at the same time when the test sheet 11 has travelled for 10 seconds after the last dripping of urine. When the results of determination by the colorimetric head 158 are displayed or printed out, examination of urine is brought to an end.

The above-mentioned operation can examine a large amount of urine continuously in a very short time. The detection system of this invention admits of simple arrangement and easy handling.

According to the embodiment of FIGS. 20 and 21, urine is dripped from the pipette 155 by a discharge mechanism for which previous programing has been undertaken in consideration of the speeds at which the respective carriers 11a to 11g are forwarded and the pipette 155 swings. However, the movement of said reagent carriers and pipette may not only be continuous but also intermittent.

There will now be described the embodiment of FIGS. 22 and 23.

Test sheets 11 each bearing five reagent carriers 11a to 11e corresponding to five items of measurement are bored with a hole 160 at the withdrawal end. These test sheets 11 are received in a cassette 60 in a superposed state as in FIG. 6. The cassette 60 is made moisture proof and provided with a test sheet-withdrawing knob 161 which pulls out the test sheets 11 one after another, each time it is operated.

A test sheet 11 taken out of the cassette 60 is brought to a prescribed point by being pinched between the feed rollers 71, 72. When the forward end of the test sheet 11 is introduced into the transport head 163 of a transport mechanism 162, a pin 164 is automatically brought down to fall into the hole 160 provided at the withdrawal end of the test sheet 11. The transport mechanism 162 is pivotally supported, rotates through a peripheral angle restricted by a guide groove 165 and a pin 166, and is driven by a gearwheel 167 and a discontinuous cog gearwheel 168. A container 83 held by a support 169 is filled with urine in which the test sheet is going to be immersed. The container support 169 is provided with a conveyor 170 for automatically transporting the urine container 83, a container guide 171 and a reciprocable rollers 172 for squeezing out test urine. A colorimetric head 91 consisting of a plurality of measurement sections is disposed above the container support 169. The container conveyor 170 is operated intermittently and in synchronization with the operation of the test sheet withdrawing knob 161 fitted to the cassette 60.

When the gear 167 engages any of the cogs of the discontinuous cog gearwheel 168, the test sheet transport mechanism 162 swings forward, causing the test sheet 11 to be further advanced and immersed in the test urine filled in the container 83. When the gear 167 engages the cog-free portion of the discontinuous cog gearwheel 168, the test sheet transport mechanism 162 swings backward, causing the test sheet 11 immersed in the urine to be pulled out of the urine container 83.

The above-mentioned forward and backward swings of the transport mechanism 162 is carried out as illustrated by the indicated arrow line A. when the test sheet 11 is going to be pulled out of the urine container 83, the right side unit of the squeeze rollers 172 is drawn close to the counterpart unit to extract excess urine from the test sheet 11. Thereafter, the test sheet 11 is lifted to face the colorimetric head 91 for colorimetric determination of the degrees of chemical reactions between the urine soaked in the reagent carriers 11a to 11e and the reagents contained therein. Upon completion of said colorimetric determination, the test sheet 11 is dumped into the urine container 83 by the second time backswing of the transport mechanism 162. Thus the whole detection system of FIG. 22 is made ready for the succeeding colorimetric determination of fresh urine. The urine container 83 now holding the measured test sheet 11 is carried away from the detection system to be replaced by the following container of fresh urine.

The above-mentioned successive colorimetric determination of FIG. 22 elevates operational efficiency, eliminates the necessity of applying any particularly large amount of manual work and attains hgh precision determination due to a chemical reaction taking place in a test sheet from which excess urine has been fully drawn forth.

There will now be described the embodiment of FIG. 24. The test sheet 11 has a plurality of reagent carriers 11a to 11e (for colorimetric determination of, for example, the occult blood, ketonic substances, glucose, protein and pH of urine) spatially mounted lengthwise on a substrate 10 in a state hermetically sealed between two sheets 175a, 175b of cellophane having moisture proof and light-obstructing properties. This arrangement protects the test sheet 11 from the harmful effects of, for example, moisture, direct sun rays and volatile chemicals. The test sheets 11, the cellophane covers 175a, 175b slightly extend outward from both ends of the test sheet 11.

A plurality of test sheets 11 are received in the cassette 60, as shown in FIG. 25, in a superposed state by folding the excess portions of the cellophane covers extending outward from both ends of each test sheet 11. The cassette 60 consists of a test sheet chamber 60a, a guide section 60b and an output opening 60c. The guide section 60b has a smaller length than that of the test sheet 11 so as to prevent it from falling downward. The outlet opening 60c is so constructed as to allow the test sheets 11 to be taken out of the cassette one after another. A pair of feed rollers 71, 72 facing the outlet opening 60c pull the test sheet 11 out of the cassette by pinching its therebetween. A takeup roller 176b for winding the cellophane sheet 175b is located on the same side as the roller 71 and another takeup roller 176a for winging the cellophane sheet 175a is positioned on the same side as the roller 72. The takeup roller 176a is driven counterclockwise and the takeup roller 176b clockwise. A colorimetric head 91 is provided in a space intervening the feed rollers 71, 72 and a urine container 83.

The forward end portion of the foremost one of the test sheets 11 received in the cassette 60 in a superposed state with the connecting portions of the cellophane covers 176a, 175b folded is drawn out through the outlet opening 60c by being pinched between the paired feed rollers 71, 72. At this time, the cellophane covers 175a, 175b are peeled off to be wound about the takeup rollers 176a, 176b respectively. After drawn out of the cassette in a state free from the cellophane covers, the test sheet 11 is temporarily held between the feed rollers 71, 72.

On the other hand, the urine container 83 is brought below the test sheet 11 by transport means (not shown) and thereafter lifted to immerse the test sheet 11 in the urine filled therein. After said immersion, the urine container 83 is immediately brought down.

When reacting with the urine soaked in the carriers 11a to 11e, the reagents contained therein present specific colors after the prescribed lengths of reaction time and are subjected to colorimetric determination by the colorimetric head 91 according to said lengths of reaction time.

Figure 26:
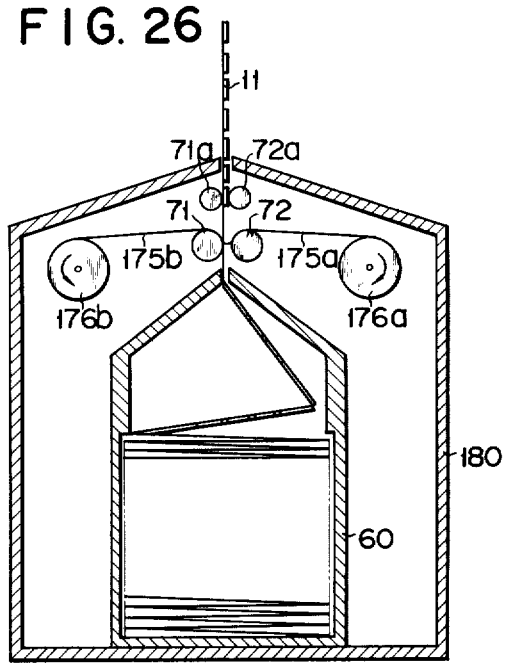
FIG. 26 is a sectional view of another example of a testing strip cassette.

There will now be described another embodiment of FIG. 26 wherein the cassette and drive means are constructed into a unitary system 180. A pair of keep rollers 71a, 72a are so disposed as to face the feed rollers 71, 72 positioned above the cassette 60. The feed rollers 71, 72 and takeup rollers 176a, 176b are interlockingly operated by switches (not shown). This arrangement provides a cassette capable of the automatic easy handling of the test sheets 11.

Figure 27:
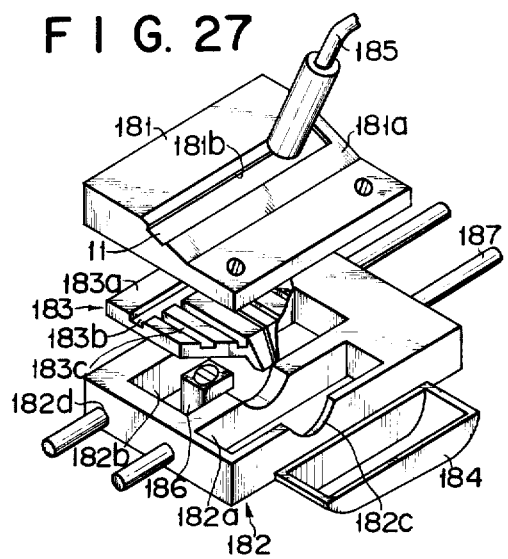
FIG. 27 is an exploded view of a bearing member for a testing strip brought into contact with a test fluid.
Figure 28:
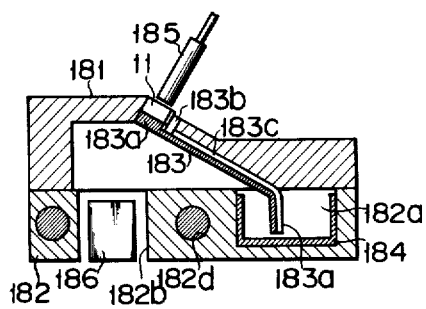
FIG. 28 is a cross sectional view of said bearing member.

There will now be described a detection system according to the embodiment of FIG. 27. In this embodiment, an excess amount of test fluid after being soaked in the reagent carriers is collected in a receiver by gravitational flow. Referring to FIGS. 27 and 28, the test sheet support consists of a top block 181, bottom block 182 and cradle 183. The top block 181 has an inclined section 181a which is bored with a narrow slip 181b through which a sample, for example, a test sheet 11 is imparted. The bottom block 182 has a cavity 182a for holding a dish 184 (FIG. 28) and another cavity 182b in which a light-receiving element 186 is placed. The first-mentioned cavity 182a is provided with notches 182c. The cradle 183 is inclined with the same gradient as the inclined section 181a of the top block, and is provided at the lower end with a transparent section 183a on which a rectangular test sheet 11 is mounted. A groove 183b is formed along the lower edge of the transparent section 183a (the right side portion of said transparent section 183a as shown in FIG. 28). A plurality of narrow grooves 183c are provided to communicate with the above-mentioned groove 183b at right angles. The cradle 183 is fitted to the top block 181 by proper support means, such that the transparent section 183a is aligned with the narrow slit 181b of the block 181. When the top block 181, cradle 183 and bottom block 182 are assembled, the lowermost end 183d of the cradle 183 which is bent downward is brought into the dish 184 as seen from FIG. 28. Referential numeral 185 denotes a source of light, 186 a light-receiving element, and 187 shafts penetrating two through holes 182d bored in the bottom block 182 so as to jointly act as a guide in shifting the test sheet suport so as to bring a plurality of reagent carriers mounted on the test sheet 11 to a prescribed point of measurement one after another.

When the test sheet 11 is measured while being placed on the transparent section 183a aligned with the narrow slit 181b of the top block 181, an excess amount of test fluid still remaining on the test sheet 11 flows into the groove 183b of the inclined cradle 183, is sucked by capillarity into the narrow grooves 183c communicating with said groove 183b, and finally into the dish 184. The measured test fluid collected in the dish 184 is thrown away by removing the top block 181 as often as required. A plurality of grooves 183c formed in the cradle 183 should preferably be made sufficiently narrow to effect capillar suction. If, however, the grooves 183c are made unduly narrow, then they will be plugged with dregs contained in the test fluid, and have to be often cleaned in order to recover lost effect. Therefore, it is advised to render the grooves 183c as broad as can give rise to capillary suction. It is further desired to choose such a gradient for the inclined cradle 183 as admits of the smooth flow of the sucked test fluid. According to the embodiment of FIG. 27, the grooves 183c have a rectangular shape, but may take semicircular, triangular or other forms.

Figure 29:
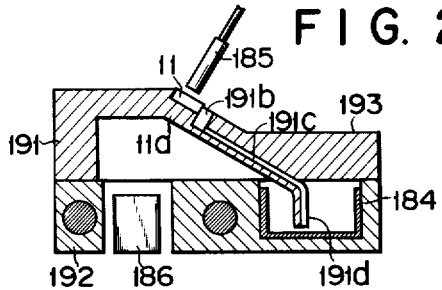
FIG. 29 is a cross sectional view of another example of said bearing member.

There will now be described a detection system according to the embodiment of FIG. 29. In this embodiment, the top block 181 of FIG. 27 is divided into two upper and lower parts along the slit 181b. The lower part is integrally formed with the cradle 183 and the upper part is concurrently used as a lid. The upper block 191 consists of a transparent section 191a on which the test sheet 11 is placed; a groove 191b formed along the lower edge of said transparent section 191a; a plurality of narrow grooves 191c communicating with said groove 191b at right angles; an inclined section 191d, whose lower end portion is bent straight downward; and a lid member 193. The other parts of FIG. 29 are the same as those of FIg. 28, description thereof being omitted.

Figure 30:
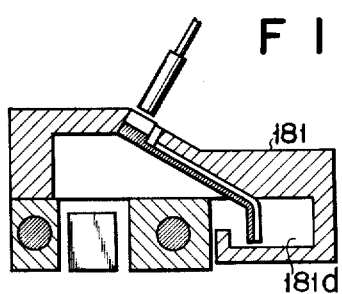
FIG. 30 is a cross sectional view of still another example of said bearing member.

There will now be described the embodiment of FIG. 30. In this embodiment, the top block 181 and dish 184 of FIg. 27 ar formed into an integral body. Namely, a cavity 181d for collecting an excess amount of test fluid is provided in said integral body.

Figure 31:
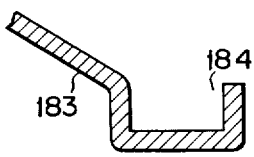
FIG. 31 is a cross sectional view of the main part of a further example of said bearing member.

There will now be described the embodiment of FIG. 31. In this embodiment, the inclined cradle 183 provided with grooves 183c is integrally fitted with the dish 184 at the lower end.

Since the embodiments of FIGS. 27 to 31 are provided with a dish 184, an excess amount of test fluid remaining on the test sheet 11 is conducted into said dish 184 through the grooves communicating with each other, saving colorimetric determination from a harmful effect and preventing the test fluid receiver and other parts of the detection system from being soiled by excess test fluid.

There will now be described the embodiment of FIG. 32. A gearwheel 201 fixed to the rotary shaft of a motor (not shown) rotates a cam 13 through geearwheels 203 to 205. Referential numeral 16 denotes a test sheet support reciprocable in the direction of the indicated arrows by proper guide means, and referential numeral 11 shows a test sheet having reagent carriers 11a to 11e spatially mounted on a narrow rectangular transparent plastic plate 10. Said test sheet 11 is positioned above the test fluid receiver 16. Referential numeral 209 is a roller fixed to the underside of a test sheet support; 21 is a light source for measurement; 22 is a light guide made of optical fiber to project a light from the source on the reagent carriers of the test sheet 11 placed on the test sheet support 16; 20 is another light guide for conducting a reflection from the reagent carriers to a light-receiving element 19 for measurement; 186 (FIG. 3) is a light-receiving element for generating a signal; 215 is a recording sheet feeder provided with a holding member 215a for supporting a recording sheet 216, said feeder being reciprocable to the right and left of FIG. 32; 217 is a wire, one end of which is fixed to the test sheet support 16, and the other end of which is attached to the recording sheet feeder 215, thereby connecting the test sheet support 16 to the recording sheet feeder 215; 218 is a spring, one end of which is fixed to a support, and the other end of which is fitted to the recording sheet feeder 215, so as to normally urge said feeder 215 to the left side of FIG. 32 and keep up the test fluid receiver through the wire 217, thereby causing the roller 209 fitted to the underside of the test fluid receiver 16 to abut against the operating surface of a cam 13; 219 is a printing drum fitted to the shaft of the gearwheel 202; and 220 is a printing hammer actuated by a solenoid 221 to make impressions on the recording sheet 216.

Figure 33:
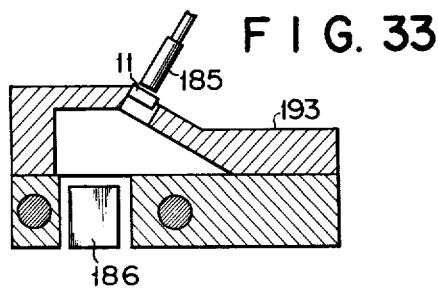
FIG. 33 is a sectional view on line X—X of FIG. 32.
Figure 34:
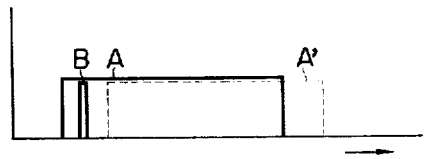
FIG. 34 indicates the wave forms of pulses.

There will now be described the operation of mechanisms for transporting the test sheet support and other members of an automatic detection system arranged as described above. When a motor (not shown) is driven, the printing drum 219 rotates in prescribed direction through the gearwheels 201 to 205, with the resultant swing of the stepped cam 13. As seen from FIG. 32, the operating surface of this stepped cam 13 mainly consists of a measurement-printing section 206a (a section having an equal distance to the rotation center of the cam 13) and a stepped feed section 206b (a section having a sharply varying distance to the rotation center of the cam). The roller 209 fitted to the test sheet support 16 and pressed against the operating surface of the cam 13 remains in the same position while the roller 209 abuts the measurement-printing section 206a of the cam surface, though the cam 13 swings at a prescribed speed, thereby preventing the test fluid receiver 16 from changing its position. When the roller 209 touches the stepped feed section 206b of the cam surface, then the roller 209 is rapidly shifted upward of FIG. 32 by the height of the stepped feed section 206b disposed between the preceding measurement-printing section 206a and the succeeding measurement-printing section 206a', causing the test sheet support 16 also to be lifted. When the moving distance of the roller 209 and consequently the test sheet support 16 is made equal to the interval between the respective reagent carriers mounted on the test sheet 11, then the above-mentioned movement causes the second reagent carrier 11b to be stopped exactly at the point of measurement, after the first reagent carrier 11a passes said point. Obviously, as the result of the lifting of the test sheet support 16, the recording sheet feeder 215 connected to said support 16 by the wire 217 waves for a prescribed distance. Where any of the reagent carriers of the test sheet 11 is brought to the point of measurement by the lifting of the test sheet support 16, then a light projected from the source 21 through the light guide 22 is obstructed, for example, by a reagent carrier 11a, failing to reach the light-receiving element 186 (FIG. 33) for generating a measurement signal. While the above-mentioned condition prevails, a signal indicated by A in FIG. 34 is continuously given forth a prescribed time interval (a slightly shorter time than that which is required for the roller 209 to pass over the measurement-recording section 206a of the cam surface). The cam 13 has a plurality of signal holes 206c bored so as to face the measurement-recording section 206a. Further, a source of light such as a light-emitting diode and a light-receiving element (neither is shown) are provided respectively on the opposite sides of the cam 13 so as to face each other through any of said signal holes 206c. When the roller 209 contacts the measurement-recording section 206a of the cam 13, then a light from the source passes through any of the signal holes 206c to be detected by the light-receiving element. Upon said detection, a signal indicated by B in FIG. 34 is produced. While both signals A and B are being produced, measurement is commenced. Where, as the result of said measurement, coincidence takes place between a signal denoting the position of the type representing a measured value delivered through any of the signal holes 219a bored in the bottom surface of the printing drum 219, then the solenoid 221 is actuated, causing said measured value to be printed on the recording sheet 216 by the printing hammer 220. Upon completion of printing, the operating surface of the cam 13 contacted by the roller 209 is changed from the section 206a to 206b, causing the test sheet support 16 to be rapidly lifted again and as the result the succeeding reagent carrier 11b to be brought to the point of measurement. Thereafter, colorimetric determination is repeated in the same manner.

Figure 32:
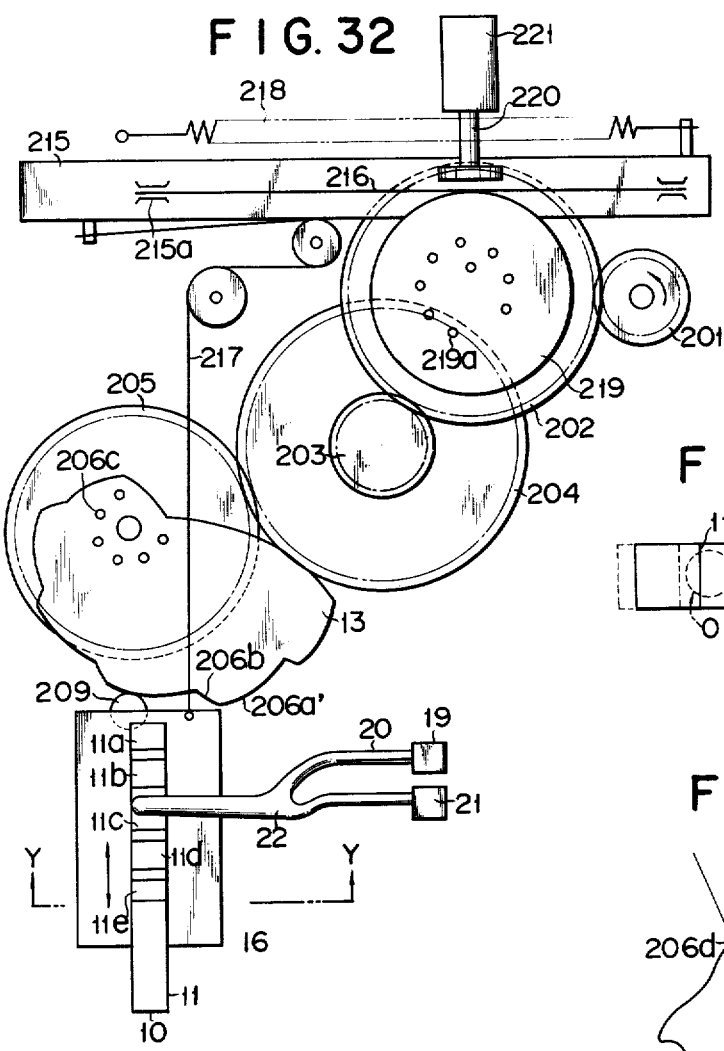
FIG. 32 is a plan view of a testing strip feeder according to another embodiment of the invention.
Figure 35:
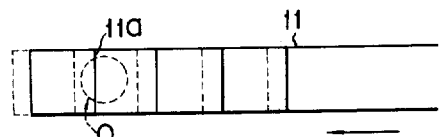
FIG. 35 presents the relative positions of the respective reagent carriers and the point of determination.
Figure 36:
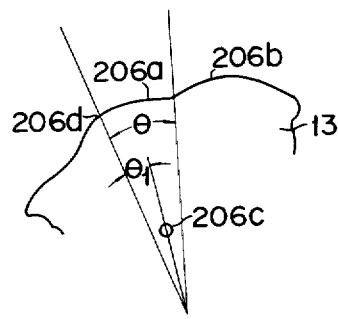
FIG. 36 is a fractional enlarged view of a stepped cam.

According to the embodiment of FIG. 32, the movement of the test sheet support for the proper positioning of the test sheet 11 is effected by the stepped cam and the roller fixed to the test heet support. When, therefore, any of the reagent carriers is mounted on the test sheet 11, the test sheet support is brought to rest. Consequently, the embodiment of FIG. 32 is free from a harmful effect resulting from changing measured values caused by varying amounts of a test fluid soaked in the reagent carriers as is often observed in the case where measurement is continued by shifting the reagent carriers even when irregularly changed colors are presented thereon. The embodiment of FIG. 32 is particularly useful where a detection system includes an analog-digital conversion device which consumes too long a time to be overlooked in measuring the amount of light received. Where a test sheet support keeps on moving and a recording sheet continuously travels independently of the test fluid receiver, printing can not be effected at an equal interval to obstruct observation. However, the embodiment of FIG. 32 in which the movement of the test sheet support and that of the recording sheet feeder are interlocked, causes the test sheet support to be moved intemittently at a prescribed step by means of a stepped cam and in consequence printing to be carried out at a prescribed interval, namely, each time the recording sheet is brought to rest. Where the test sheet 11 happens to be displaced, as shown in FIG. 35, from its proper position while being transported in the direction of an arrow indicated therein, then a reagent carrier, for example, 11a is delayed in reaching a point O of measurement, namely, a point exposed to a light from the source 21 for measurement. Accordingly, a signal A is generated appreciably later than a signal B, as indicated by broken lines A', preventing any measurement from taking place. Therefore, it is necessary to allow a sufficiently long interval between the point of time at which the signal A is given forth and that at which the signal B is produced to eliminate the occurrence of the above-mentioned undesirable event due to the slight displacement of the test sheet 11. To this end, it is advised to cause the end 206d of the measurement-recording section 206 a of the operating surface of the cam 13 and the signal hole 206c jointly to define a fully broad angle θ1. This arrangement eliminates the possibility that where the test fluid receiver moves continuously instead of stepwise, the delayed commencement of measurement (carried out during the presence of both signals A, B) will cause any of the reagent carriers to be moved considerably ahead, probably losing a required time of measurement.

According to the embodiment of FIG. 32, a device for generating the signal B is provided on the stepped cam 13. However, said device may be fitted to the test sheet support 16 or recording sheet feeder 215.

Figure 37:
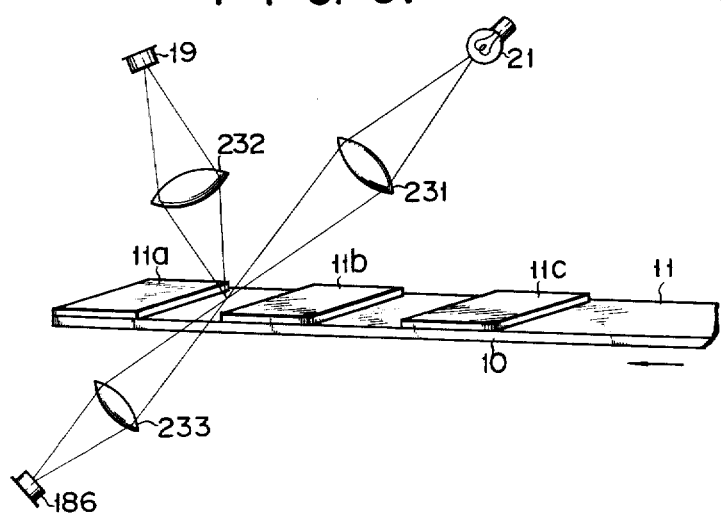
FIG. 37 is an oblique view of a determination mechanism.

There will now be described the operation of a light measuring device of FIG. 37 which can accurately measure an amount of light reflected from the spatially arranged reagent carriers at a proper point of measurement. Referential numeral 11 denotes a test sheet having a plurality of carriers 11a to 11c soaked with different reagents and spatially arranged on a substrate 10 formed of, for example, plastic material. The test sheet 11 is transported in the direction of an arrow indicated in FIG. 37 by proper drive means (not shown). Referential numeral 21 is a light source for measurement which illuminates the surface of the test sheet 11 through an optical device 231. Referential numeral 19 is light-receiving element such as a phototransistor, which measures the amount of a reflection from a reagent carrier, for example, 11b delivered through an optical device 232 and determines the degree of a chemical reaction between a test fluid and the reagent contained in the carrier 11b from its changed color. Referential numeral 186 is another light-receiving element which is positioned on the opposite side of the test sheet 11 to the first mentioned light-receiving element 19 and detects by an optical device 232 a light-from the source 21 which has penetrated the test sheet 11. In the embodiment of FIG. 37, an optical device for projecting a light from the source 21 on the reagent carrier 11b consists of a lens, but may be formed of any other material such as optical fiber. Where the test sheet 11 travels in the direction of the indicated arrow and the reagent carrier 11b is brought exactly to a point exposed to a light from the source 21, then measurement is made of the amount of a reflection from the surface of said reagent 11b. In this case, the reagent carrier 11b substantially shuts off the source light from the second light-receiving element 186. Where the carrier-free transparent portion 10 of the test sheet 11 is brought to a point exposed to the source light, most of the source light passes through said transparent portion 10 to be detected by the light-receiving element 186. If, in this case, the second light-receiving element 186 is so designed as to give forth a signal when not supplied with a light and a circuit for measuring a reflection from the reagent carrier 11b which has entered the first mentioned light-receiving element 19 is put into operation only upon receipt of the above-mentioned signal denoting the absence of light in the other light-receiving element 186, then mreasurement can be successively made of the respective reagent carriers 11a to 11c only when they are brought exactly to a point of measurement.

In the embodiment of FIG. 37, the second signal-generating light-receiving element 186 is disposed on the opposite side of the test sheet 11 to the light source 21 so as to emit a signal when not supplied with a light pernetrating the test sheet 11. However, said second light-receiving element 186 may be positioned on the same side of the test sheet 11 as the light source 21 so as to generate a signal denoting a sudden change in the amount of a reflection from any of the reagent carriers 11a to 11c. In this case, a single light-receiving element may be used concurrent for measurement, as well as for generation of a signal, with both output signals from said element distinguished by proper electrical means. In such case, it is possible to use a substrate of high reflectivitiy instead of a transparent one for the test sheet 11.

The light-measuring device of FIG. 37 wherin the signal-generating light-receiving element 186 gives forth an output when not supplied with light enables measurement of the reagent carriers to be effected only upon receipt of said output denoting the absence of light, thereby attaining accurate measurement when the reagent carriers are brought exactly to a point of measurement. Therefore, the light-mreasuring device of FIG. 37 is particularly useful where successive measurement is automatically carried out. Namely, where the test sheet 11 happens initially to take an improper position or to be slightly displaced, said light-measuring device commences measurement only when the respective reagent carriers of the test sheet are brought to a specified point of measurement.

What we claim is:

1. A system for detecting the particular chemical constituent of a fluid, comprising:
   a test sheet support having a roller fixed thereto for supporting a chemical reaction test sheet provided with a plurality of carriers containing different reagents;
   photoelectric detection means including a first light-emitting element for emitting a light on a selected one of said reagent carriers, and a first photoelectric element for receiving a reflectd light from said selected reagent carrier to generate an electrical signal corresponding to the degree of chemical reaction between the test fluid and the reagent contained in said selected carrier;
   a measuring circuit connected to receive said electrical signal generated by said first photoelectric element;
   a stepped cam having a plurality of signal holes therein and an operating surface having a plurality of steps which are located with a predetermined correspondence to said signal holes;
   driving means coupled to said stepped cam for rotating said stepped cam;
   means for pressing said roller of said test sheet support against said stepped operating surface of said stepped cam so as to intermittently shift the test sheet according to the rotation of said stepped cam; and
   a signal generator coupled to said measuring circuit and having a second light-emitting element for emitting a light through said signal holes, and a second photoelectric element for receiving light transmitted through said signal holes and for generating a measuring command signal, said measuring command signal being applied to said measuring circuit in response to said second photoelectric element receivjng light transmitted through said signal holes.

2. A detection system according to claim 1 wherein said chemical reaction test sheet has carriers provided with a predetermined spacing therebetween and has transparent portions formed between two adjacent carriers; and said system further comprises a third photoelectric element for receiving a light penetrating said transparent portions of the test sheet to generate an output signal actuating said first photoelectric element.

3. A detection system according to claim 1 wherein said test sheet support comprises an upper block having an inclined surface bored with a rectangular slit; an inclined cradle having a plurality fo narrow grooves extending in the direction of inclination of said cradle; and a dish for collecting an excess amount of test fluid flowing to said cradle from said reagent carriers of the test sheet placed on said test sheet support.

4. A detection system according to claim 1 wherein said first light-emitting means comprises a lamp and a first light guide for conducting a light from the lamp to the surface of each reagent carrier; and said first photoelectric element comprises a second light guide for leading a reflection from each reagent carrier to said first photoelectric element.

* * * * *